Figure 1:
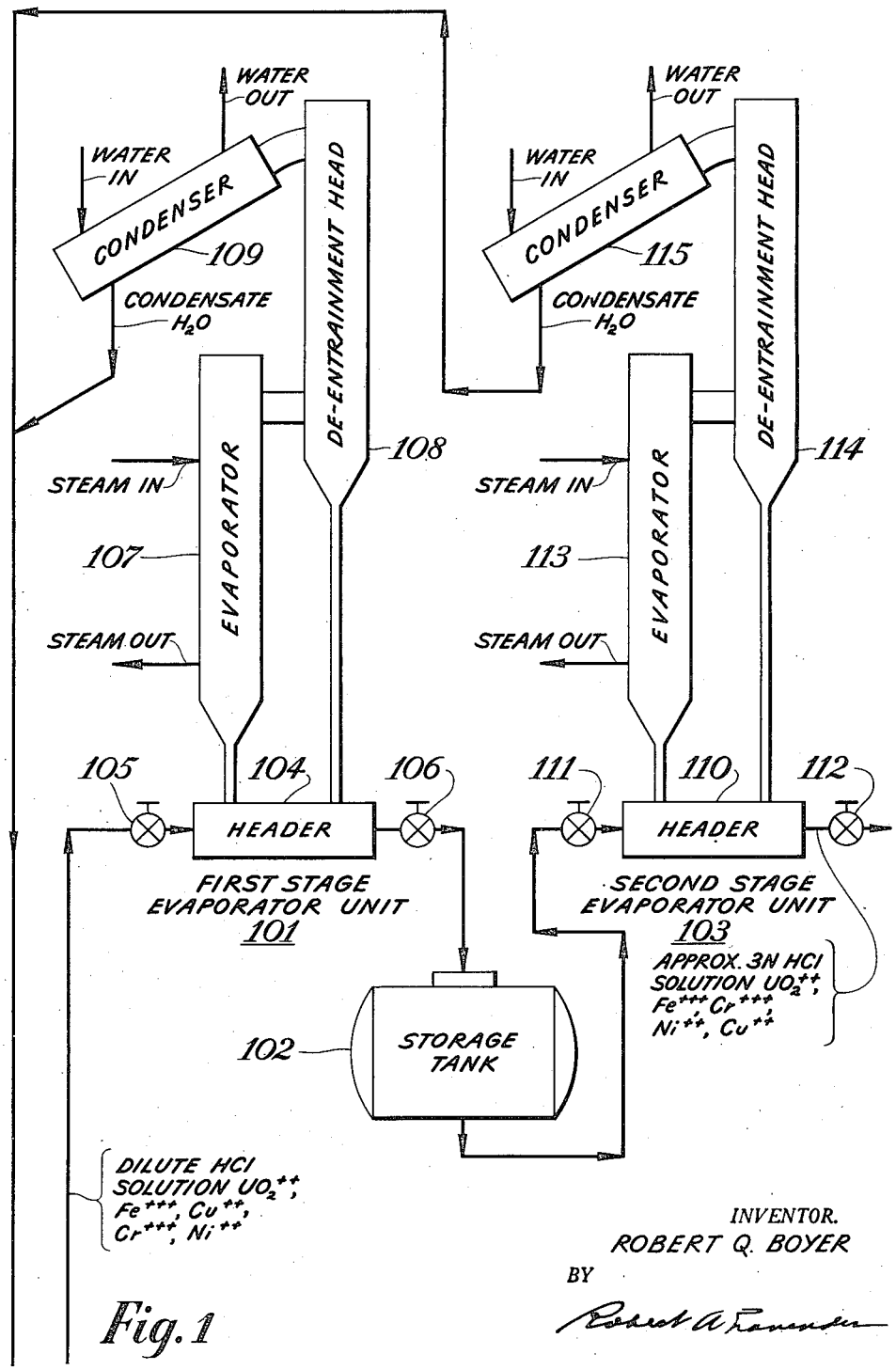
Figure 2:
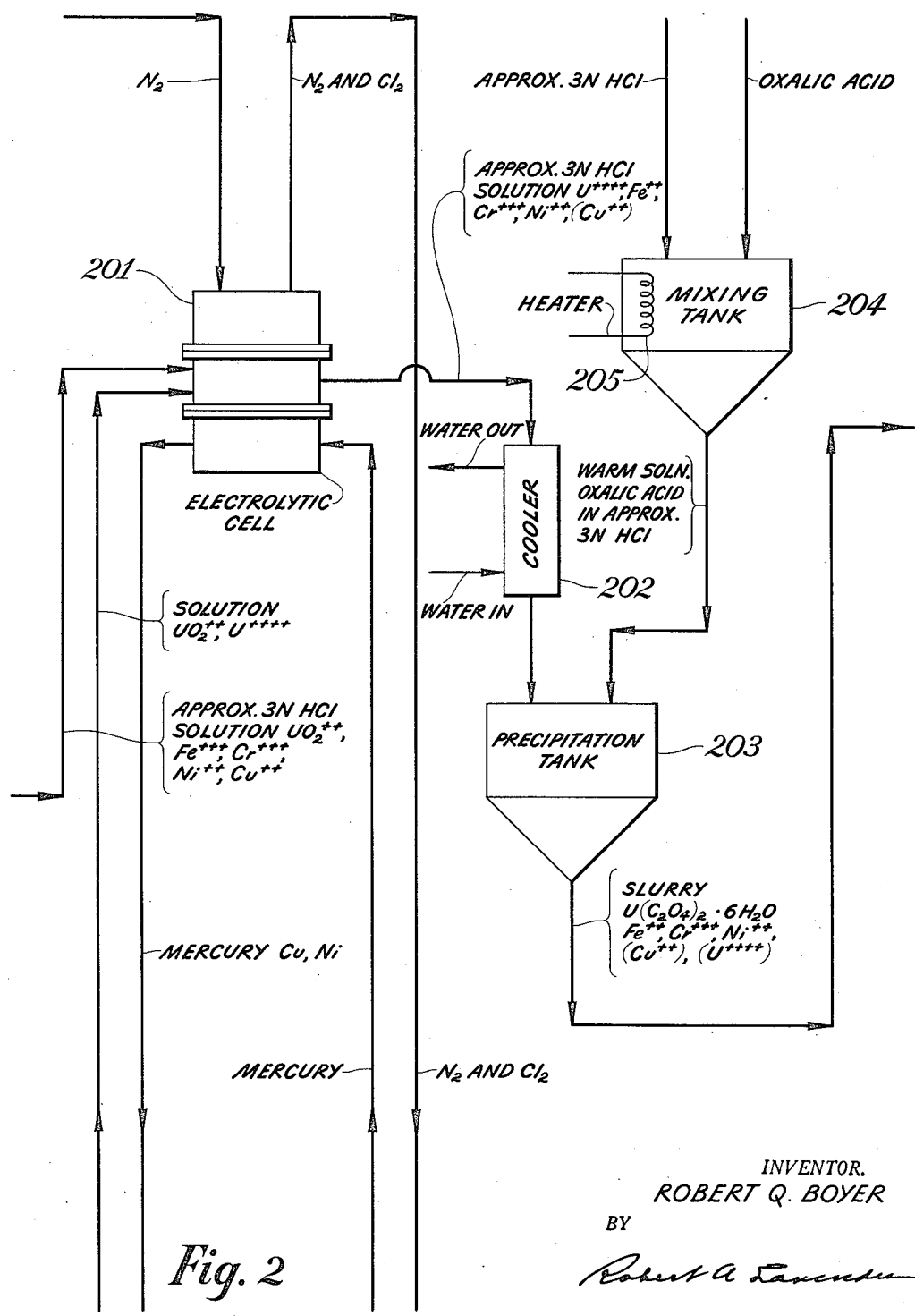
Figure 3:
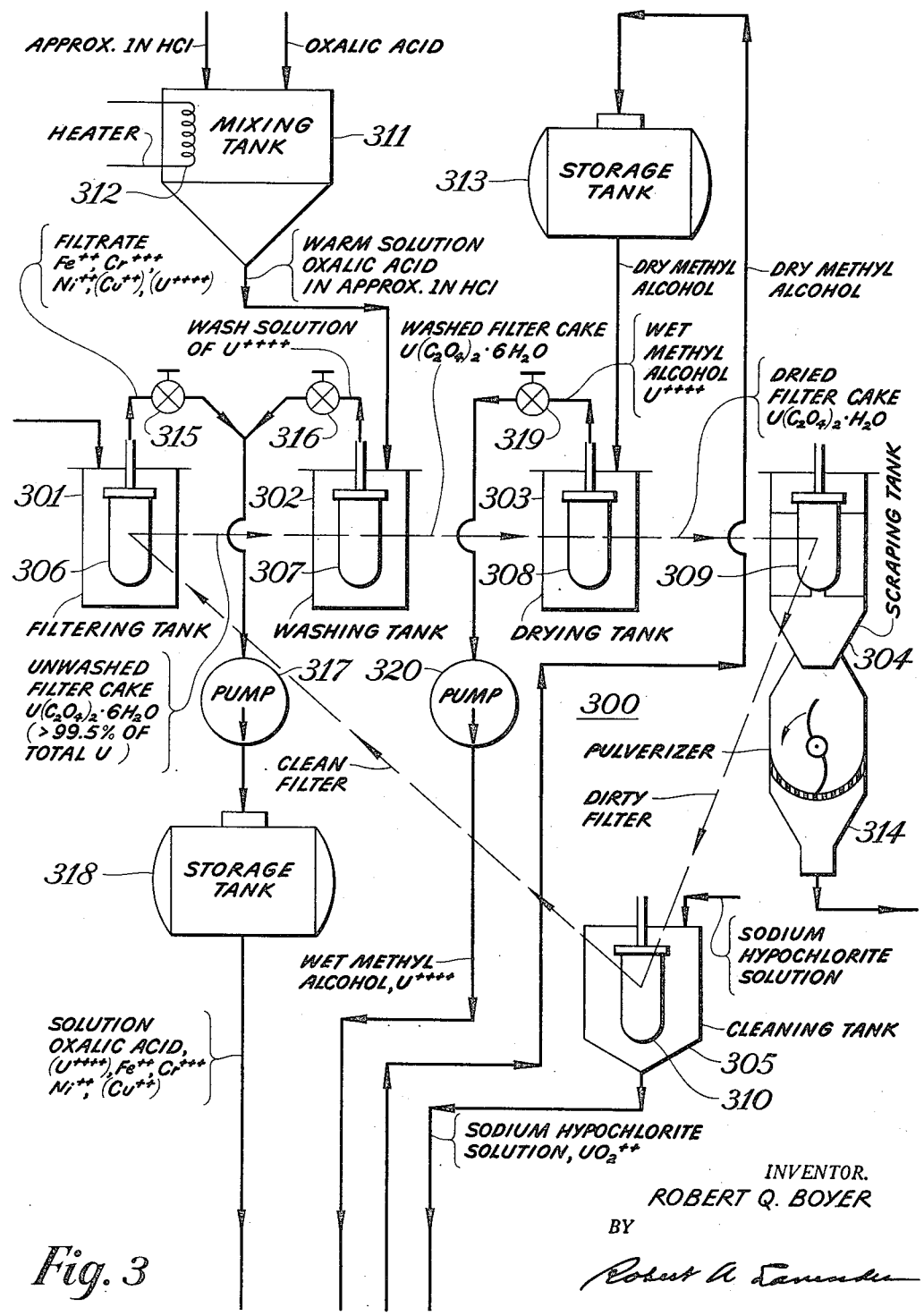
Figure 4:
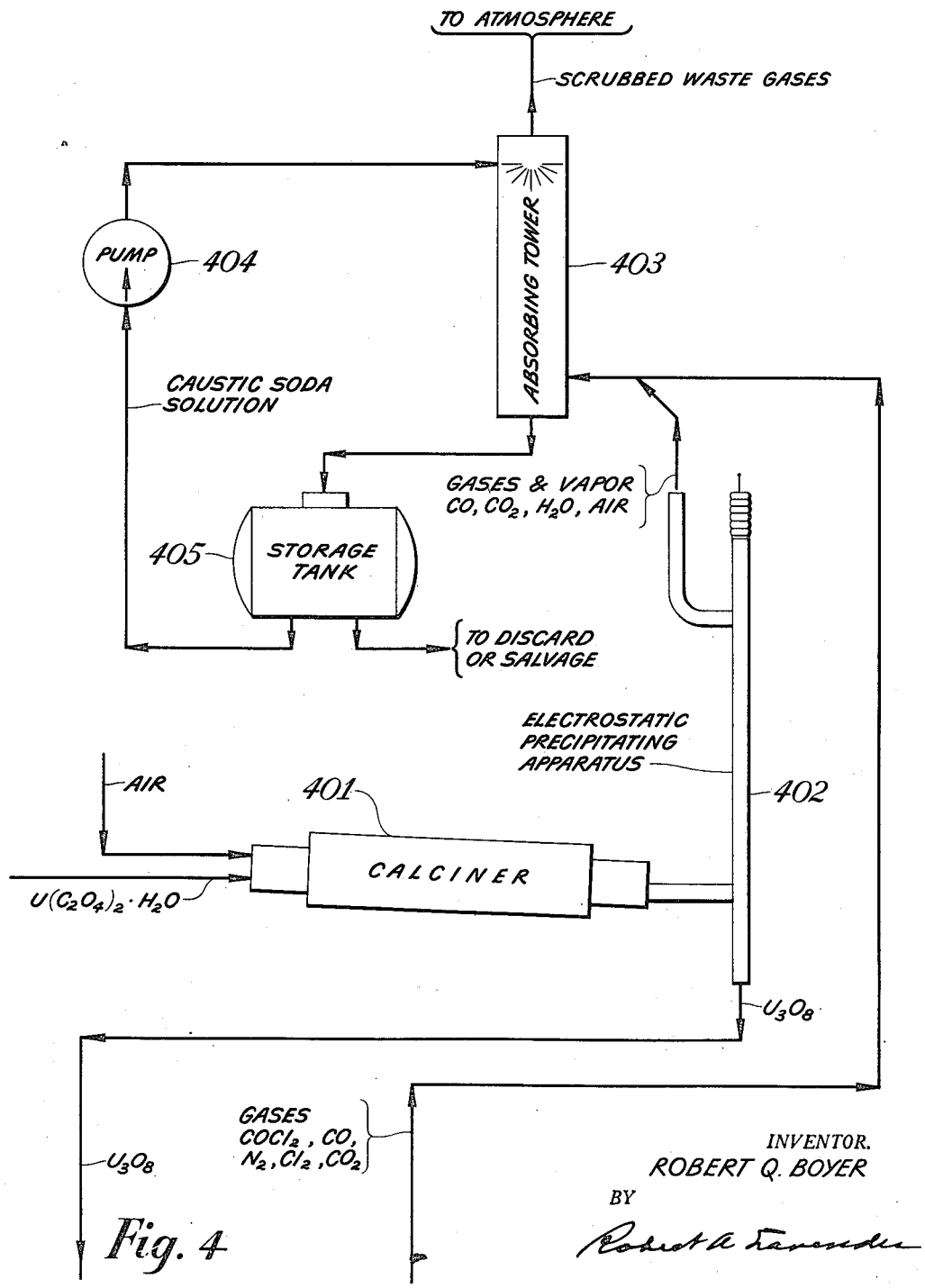
Figure 5:
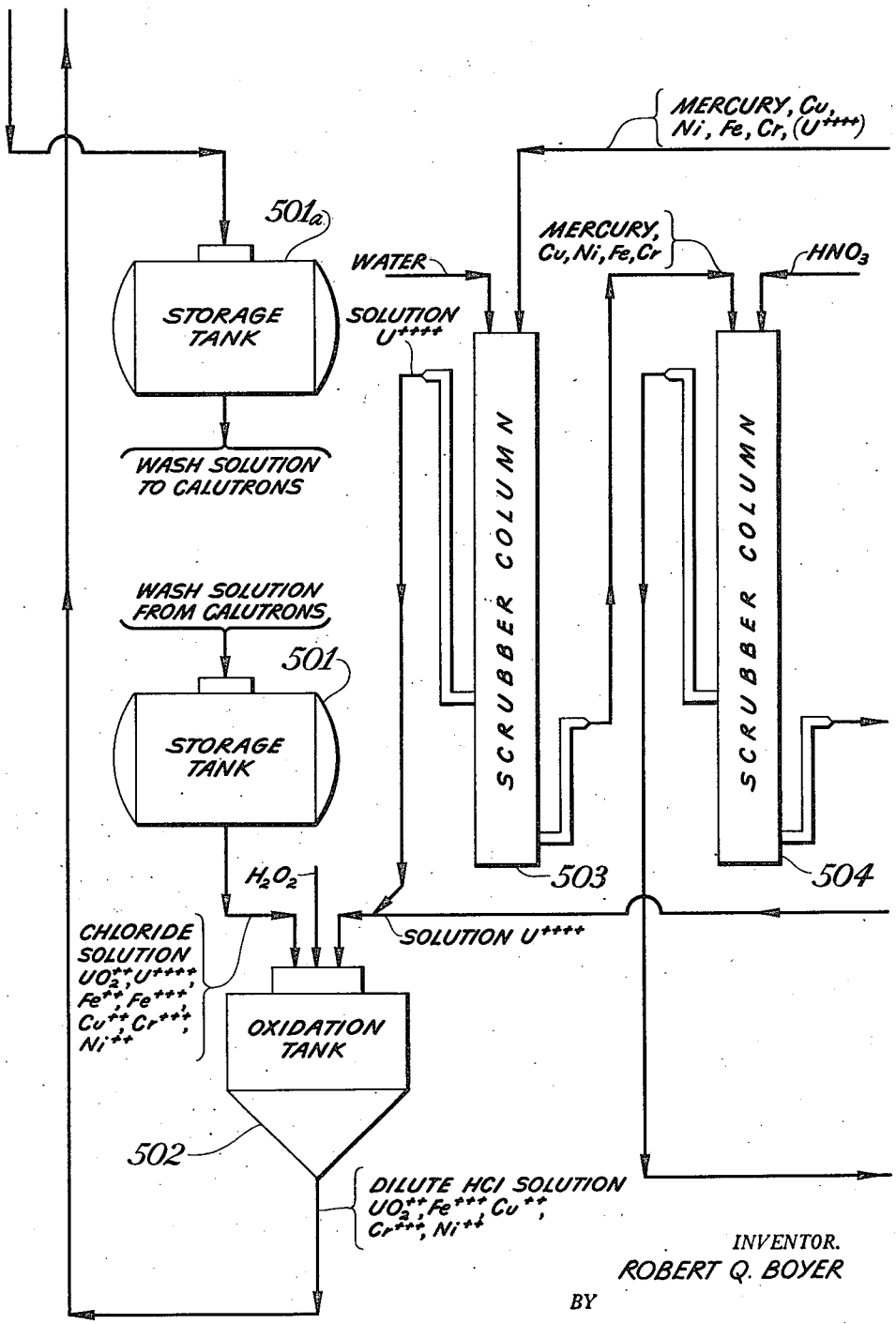
Figure 6:
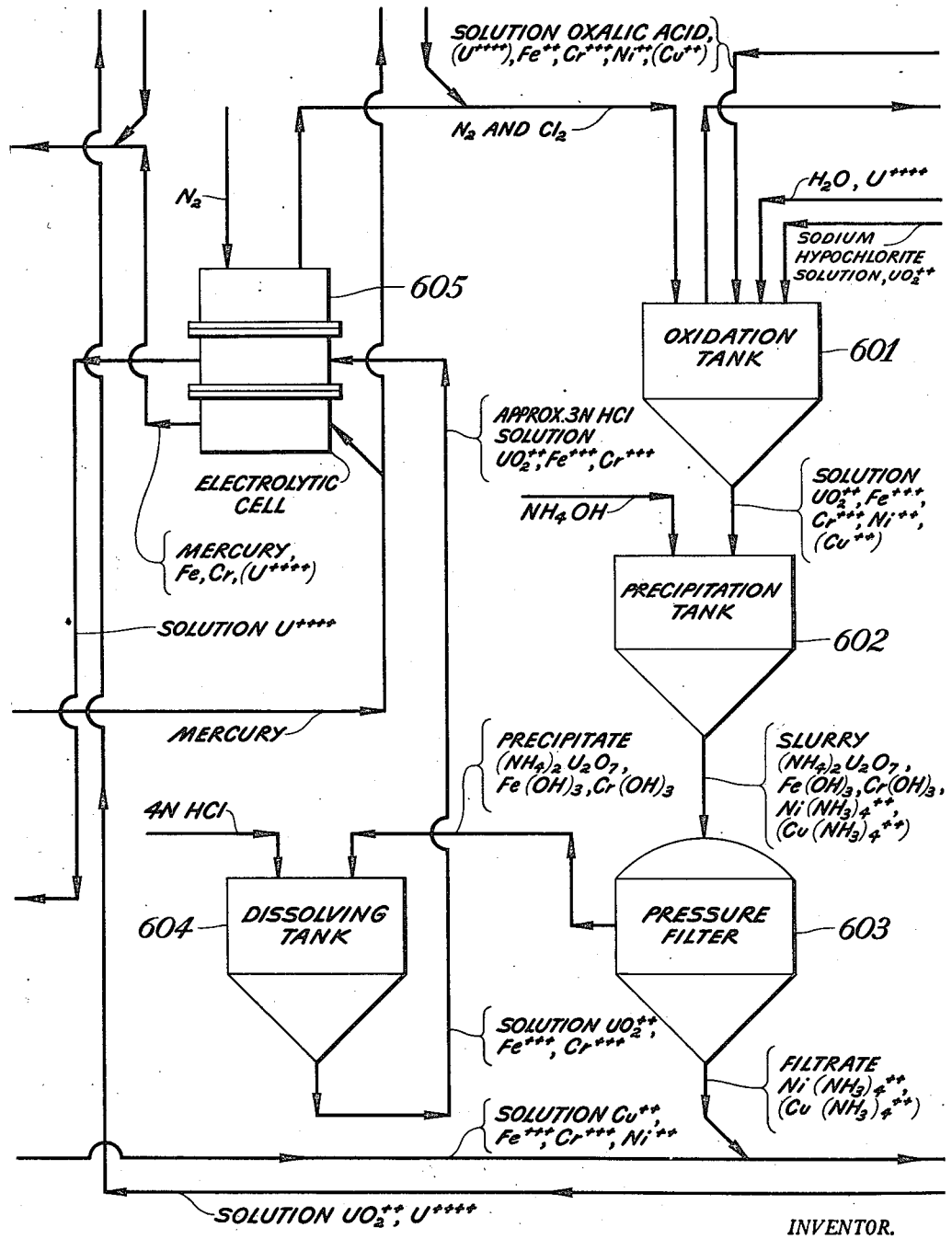
Figure 7:
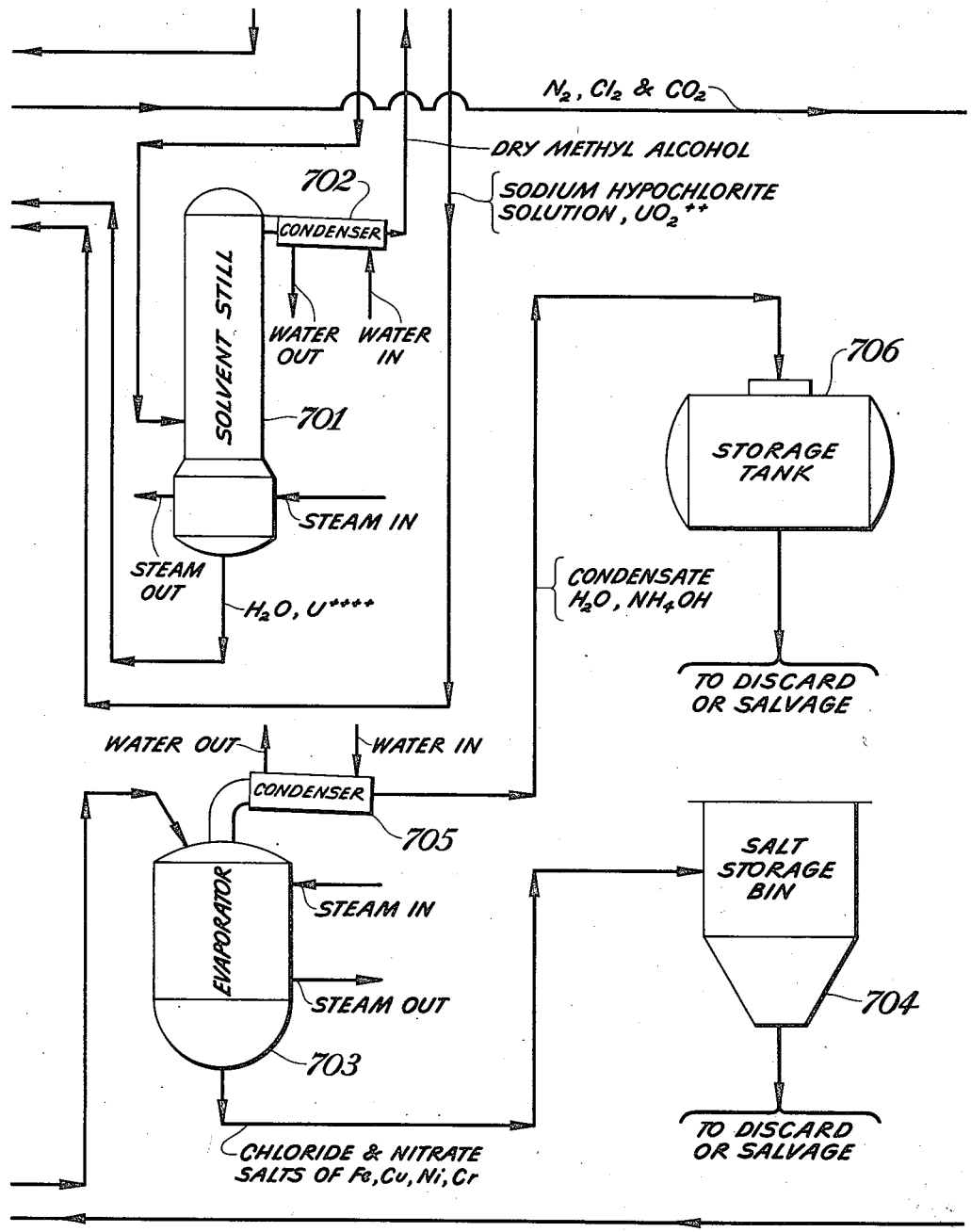
Figure 8:
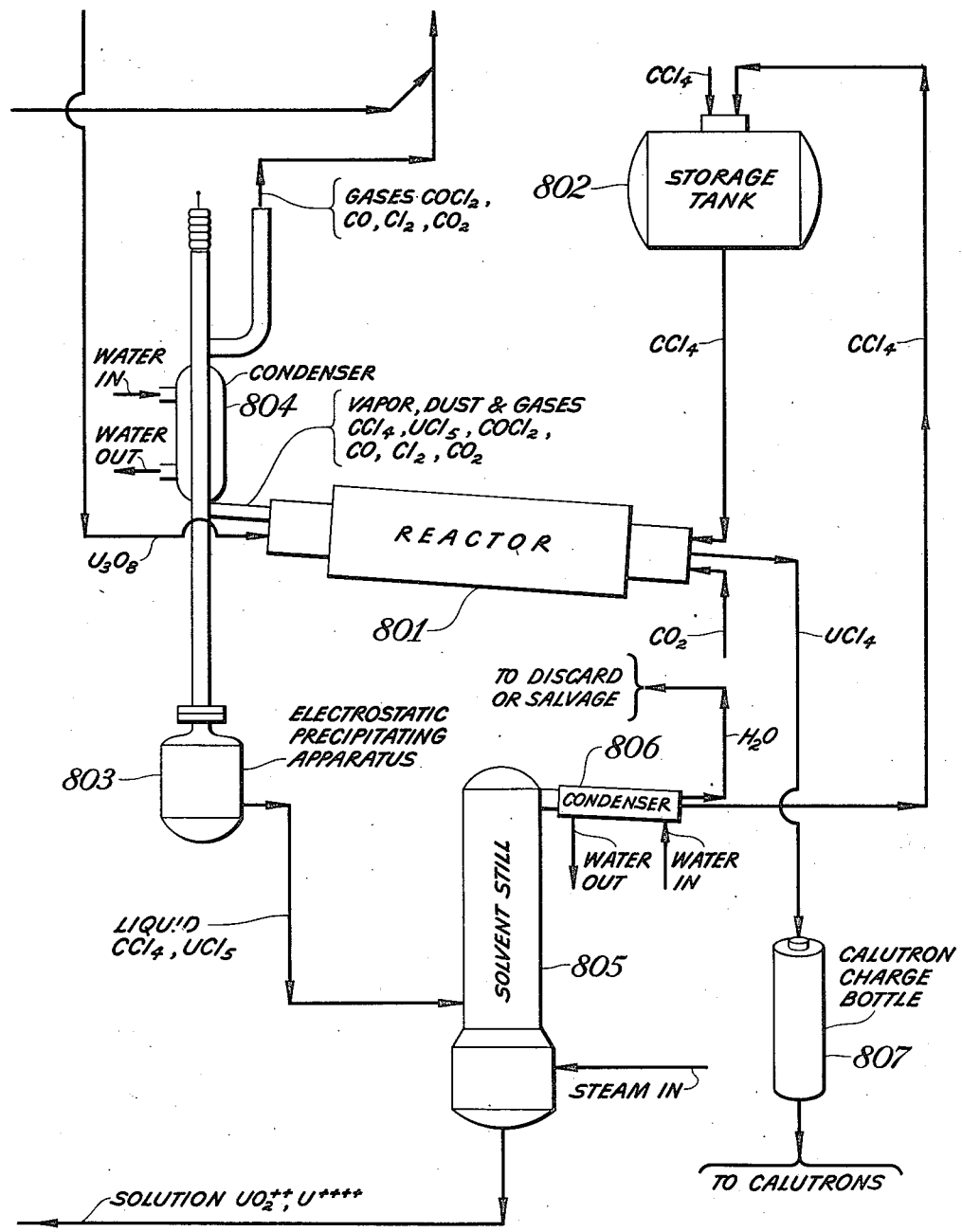

June 18, 1957 R. Q. BOYER 2,796,393
PROCESS OF RECOVERING URANIUM FROM CALUTRON WASH SOLUTIONS
Filed Feb. 12, 1945 9 Sheets-Sheet 1

INVENTOR.
ROBERT Q. BOYER
BY

June 18, 1957 R. Q. BOYER 2,796,393
PROCESS OF RECOVERING URANIUM FROM CALUTRON WASH SOLUTIONS
Filed Feb. 12, 1945 9 Sheets-Sheet 5

INVENTOR.
ROBERT Q. BOYER
BY

June 18, 1957 R. Q. BOYER 2,796,393
PROCESS OF RECOVERING URANIUM FROM CALUTRON WASH SOLUTIONS
Filed Feb. 12, 1945 9 Sheets-Sheet 9

INVENTOR.
ROBERT Q. BOYER
BY
ATTORNEY.

United States Patent Office 2,796,393
Patented June 18, 1957

2,796,393
PROCESS OF RECOVERING URANIUM FROM CALUTRON WASH SOLUTIONS

Robert Q. Boyer, Berkeley, Calif., assignor to the United States of America as represented by the United States Atomic Energy Commission Application February 12, 1945, Serial No. 577,380

17 Claims. (Cl. 204—1.5)

The present invention relates to processes of treating calutron wash solutions, and more particularly to plant processes of recovering uranium from such wash solutions derived from calutrons employed in the calutron method of producing uranium enriched with $U^{235}$.

In the copending application of Ernest O. Lawrence, Serial No. 557,784, filed October 9, 1944 which issued as Patent No. 2,709,222 on May 24, 1955, there is disclosed a "calutron," a machine designed to separate the constituent isotopes of an element and, more particularly, to increase the proportion of a selected isotope in an element containing several isotopes, in order to produce the element enriched with the selected isotope. More specifically, the calutron mentioned is especially designed to produce uranium enriched with the isotope $U^{235}$.

In the copending application of James M. Carter and Martin D. Kamen, Serial No. 532,159, filed April 21, 1944 which issued as Patent No. 2,758,006 on August 7, 1956, there is disclosed an improved process of producing uranium enriched with $U^{235}$ employing the calutron method and comprising first-stage and second-stage calutrons. In accordance with this process, uranium of natural or normal isotopic composition is treated in a first-stage calutron in order to produce as a product uranium singly enriched with $U^{235}$, which uranium singly enriched with $U^{235}$ is treated in a second-stage calutron in order to produce as a product uranium doubly enriched with $U^{235}$, which uranium doubly enriched with $U^{235}$ may be used commercially. In the operation of either a first-stage calutron or a second-stage calutron the compound $UCl_4$ is treated, whereby a residue of the $UCl_4$ is deposited on the parts of the calutron disposed in the source region thereof, metallic uranium enriched with $U^{235}$ is deposited in the first pocket of the collector of the calutron, and metallic uranium improverished with respect to $U^{235}$ is deposited in the second pocket of the collector of the calutron. The deposit of $UCl_4$ is recovered by a water wash step and the deposits of metallic uranium are separately recovered by acid wash steps; and the three wash solutions are separately purified, if required, to produce three separate batches of a given compound of uranium. In this process, a first batch of the uranium compound mentioned, produced from the water wash derived from first-stage calutrons, is then converted back to $UCl_4$ for re-treatment in the first-stage calutrons, and a second batch of the uranium compound mentioned, produced from the water wash derived from second-stage calutrons, is then converted back to $UCl_4$ for re-treatment in the second-stage calutrons.

In the copending application of Martin D. Kamen and Abel De Haan, Serial No. 542,378, filed June 27, 1944, now Patent No. 2,771,340, dated November 20, 1956, there is disclosed an improved process of purifying a water wash solution of the character mentioned in order to separate uranium from metallic impurities in the solution. In accordance with this process, a water wash solution containing uranium, copper, nickel, iron, and chromium in the form of chlorides is first concentrated; and the concentrated solution containing $UO_2^{++}$, $Cu^{++}$, $Ni^{++}$, $Fe^{+++}$, and $Cr^{+++}$ ions is then reduced electrolytically, whereby the uranyl ion, $UO_2^{++}$, and the ferric ion, $Fe^{+++}$, are respectively reduced to the uranous ion, $U^{++++}$, and the ferrous ion, $Fe^{++}$. Thus, the reduced solution contains $U^{++++}$, $Cu^{++}$, $Ni^{++}$, $Fe^{++}$, and $Cr^{+++}$ ions; and to this reduced solution there is added oxalic acid, whereby the uranium is precipitated as $U(C_2O_4)_2 \cdot 6H_2O$ away from the metal impurities in the solution. The solution is then filtered in order to separate the uranous oxalate precipitate, leaving the metal ions mentioned in the filtrate; and the uranium compound mentioned is converted back to $UCl_4$ for further treatment in the appropriate stage of the calutrons, as previously explained.

In plant operations employing the calutron method of producing uranium enriched with $U^{235}$, and utilizing the procedure disclosed in the Carter and Kamen application mentioned in the modified form disclosed in the Kamen and De Haan application mentioned, all as explained above, considerable care must be exercised in handling the water wash solution derived from the second-stage calutrons, in view of the fact that the last-mentioned water wash solution constitutes a chloride solution of relatively large volume and the uranium contained therein has been singly enriched with $U^{235}$ due to the previous treatment thereof in the first-stage calutrons. Moreover, after this water wash solution has been subjected to oxalic acid treatment in order to precipitate most of the uranium as $U(C_2O_4)_2 \cdot 6H_2O$ away from the metal impurities contained and the precipitate has been recovered by filtration, a filtrate is recovered containing a relatively small amount of uranium and substantially all of the metal impurities mentioned. Since the uranium contained in the last-mentioned filtrate has been singly enriched with $U^{235}$ due to the previous treatment thereof in the first-stage calutrons, the salvage of substantially all of this uranium from this filtrate is essential. Furthermore, in converting the $U(C_2O_4)_2 \cdot 6H_2O$ precipitate mentioned back to $UCl_4$ to be treated further, great care must be exercised, as no substantial loss of this valuable singly enriched uranium can be tolerated.

Accordingly, it is an object of the invention to provide an improved plant process of treating calutron wash solutions, especially such solutions derived from second-stage calutrons employed in the calutron method of producing uranium enriched with $U^{235}$ wherein substantially all of the contained uranium is recovered and losses thereof to the outside are negligible.

Another object of the invention is to provide an improved plant process of separating uranium from metal impurities contained in a calutron wash solution and then converting the recovered uranium back to uranium tetrachloride for re-treatment in a calutron employed in the calutron method of producing uranium enriched with $U^{235}$, wherein substantially all of the filtrates, precipitates and other reaction products produced incident to the separation and conversion are subjected to appropriate salvage treatments in order to prevent losses of the contained uranium to the outside.

Another object of the invention is to provide an improved process of dehydrating a uranous oxalate precipitate prior to calcination thereof to produce a uranium oxide.

A further object of the invention is to provide an improved filtration process utilizing a candle filter, whereby uranous oxalate precipitate may be loaded upon and subsequently unloaded from the candle filter in an efficient manner.

A further object of the invention is to provide an improved process of salvaging relatively small amounts of uranous oxalate precipitate deposited upon the surfaces of filtering apparatus.

A further object of the invention is to provide an improved process of decomposing an oxalic acid solution containing a relatively small amount of uranium and of placing the contained uranium in solution in the plus 6 oxidation state.

A further object of the invention is to provide an improved process of salvaging relatively small amounts of uranium contained in an oxalic acid filtrate from which uranous oxalate precipitate has been removed by filtration.

A further object of the invention is to provide in conjunction with the treatment in an electrolytic cell having a mercury cathode of a solution containing uranium and metal impurities, an improved process of separately recovering the uranium contained in the electrolyzed solution and any uranium contained in the mercury of the mercury cathode.

A further object of the invention is to provide an improved process of recovering a fraction of uranium from reaction gases produced incident to the calcination of uranous oxalate.

A further object of the invention is to provide an improved process of recovering a fraction of uranium from reaction gases produced incident to the conversion of a uranium oxide to uranium tetrachloride.

A still further object of the invention is to provide in conjunction with the reclamation of uranium from solution an improved process of preventing re-oxidation of $U^{++++}$ ion back to $UO_2^{++}$ ion, following reduction of $UO_2^{++}$ ion to $U^{++++}$ ion.

Figure 9:
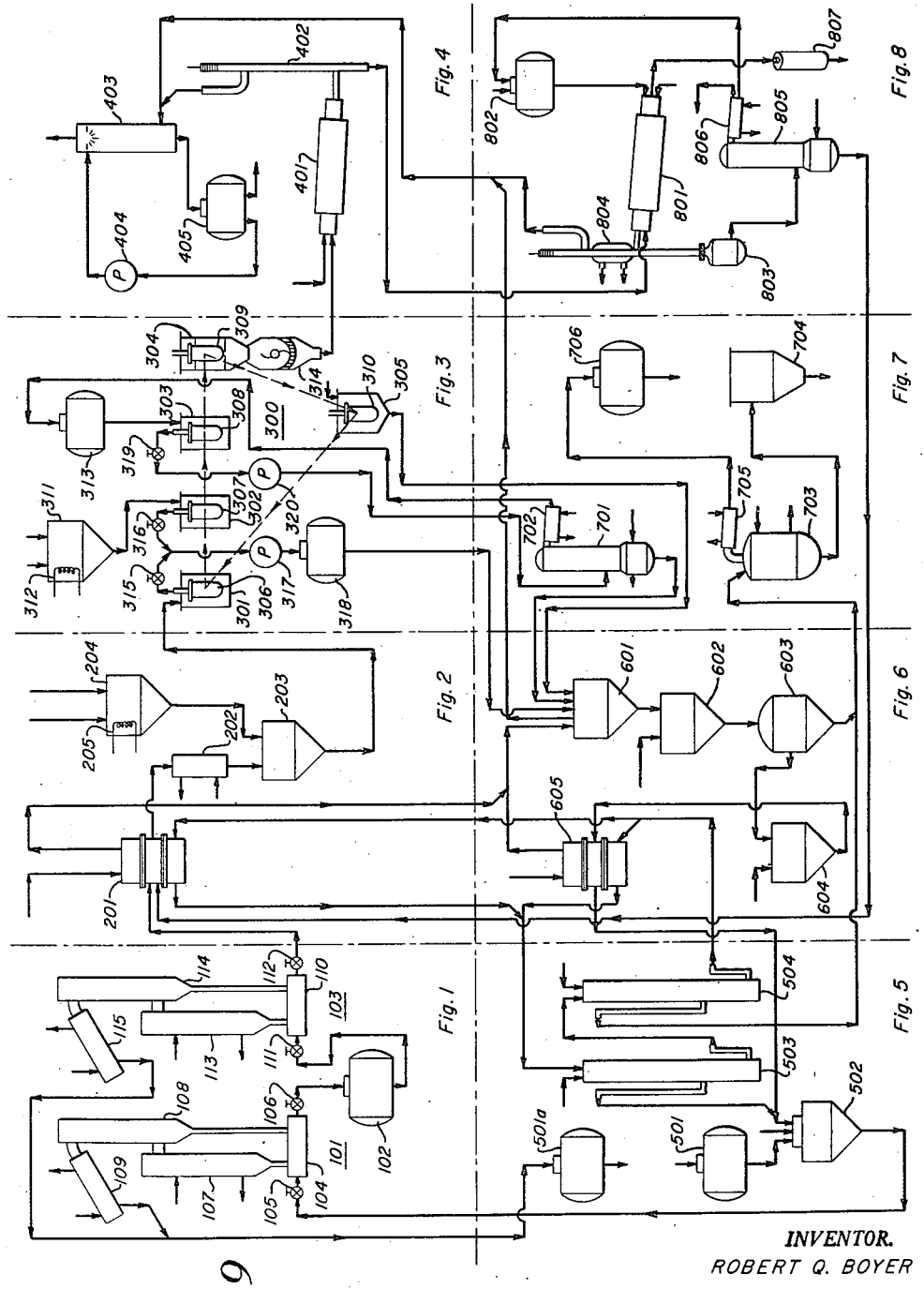

The invention, both as to its organization and method of operation, together with further objects and advantages thereof, will best be understood by reference to the following specification, taken in connection with the accompanying drawing in which Figures 1 to 8, inclusive, taken together, illustrate diagrammatically a plant arrangement for treating calutron wash solutions, and in which the processes of the present invention may be carried out. In order to form a unified plant arrangement of the drawing, Figs. 1 to 4, inclusive, should be arranged in upstanding position in sequence to the right to form a first strip; Figs. 5 to 8, inclusive, should be arranged in upstanding position in sequence to the right to form a second strip; and the first strip should be placed above the second strip to form a block as shown in reduced scale in Fig. 9 of the drawing.

Referring now more particularly to Figs. 1 to 8, inclusive, of the drawing, there is illustrated diagrammatically a plant arrangement for treating calutron wash solutions that embodies the features of the present invention and comprises a storage tank 501 adapted to receive a calutron wash solution which is to be subjected to treatment. More particularly, the wash solution contained in the storage tank 501 normally comprises a mixture of the water wash solution derived from washing the deposits of $UCl_4$ residues from the parts disposed in the source regions of the second-stage calutrons and the acid wash solution derived from washing the deposits of metallic uranium enriched with $U^{235}$ from the first pockets of the collectors of the first-stage calutrons; this wash solution comprising a chloride solution containing the following ions: $UO_2^{++}$, $U^{++++}$, $Fe^{+++}$, $Fe^{++}$, $Cu^{++}$, $Cr^{+++}$, and $Ni^{++}$; the uranium contained being singly enriched with the isotope $U^{235}$ with respect to natural or normal uranium and the enrichment factor being of the order of 20; all as disclosed in the previously mentioned application of Carter and Kamen.

The storage tank 501 is connected to an oxidation tank 502, whereby the wash solution contained in the storage tank 501 may be delivered to the oxidation tank 502. Also, the oxidation tank 502 is connected to a suitable source of $H_2O_2$, not shown, whereby the wash solution contained in the oxidation tank 502 may be subjected to oxidation in order to oxidize the $U^{++++}$ and $Fe^{++}$ ions respectively to $UO_2^{++}$ and $Fe^{+++}$ ions, the oxidized solution constituting a dilute HCl solution containing $UO_2^{++}$, $Fe^{+++}$, $Cr^{+++}$, $Ni^{++}$, and $Cu^{++}$ ions. Further, the oxidation tank 502 is connected to a first-stage evaporator unit 101, whereby the oxidized solution mentioned may be delivered from the oxidation tank 502 to the evaporator unit 101 to be concentrated by evaporation. The evaporator unit 101 is connected to a storage tank 102, which in turn is connected to a second-stage evaporator unit 103, whereby the solution concentrated in the first-state evaporator unit 101 may be delivered to the storage tank 102 and then delivered therefrom to the second-stage evaporator unit 103 to be further concentrated by evaporation.

Preferably, the first-stage evaporator unit 101 and the second-stage evaporator unit 103 are substantially identical, although the evaporator unit 101 normally has a slightly larger heat-exchange capacity than the evaporator unit 103, in view of the fact that a larger amount of vapor is driven from the solution entering the first-stage evaporator unit 101 than is driven from the solution entering the second-stage evaporator unit 103, as explained more fully hereinafter. Also, it is preferable that each of the evaporator units 101 and 103 is substantially identical to the evaporator unit disclosed in the copending application of Robert Q. Boyer, Serial No. 529,012, filed March 31, 1944 which was abandoned on March 14, 1951.

Specifically, the evaporator unit 101 comprises a header 104, a manually adjustable inlet valve 105, a manually adjustable outlet valve 106, an evaporator 107, a de-entrainment head 108, and a condenser 109. The header 104, the evaporator 107, and the de-entrainment head 108 are lined with tantalum; the evaporator 107 is connected to a suitable source of steam under pressure, not shown; and the condenser 109 is supplied with cooling water from a source, not shown. Similarly, the evaporator unit 103 comprises a header 110, a manually adjustable inlet valve 111, a manually adjustable outlet valve 112, an evaporator 113, a de-entrainment head 114, and a condenser 115. The header 110, the evaporator 113, and the de-entrainment head 114 are lined with tantalum; the evaporator 113 is connected to a suitable source of steam under pressure, not shown; and the condenser 115 is supplied with cooling water from a source, not shown.

The condensers 109 and 115 are connected in parallel to a storage tank 501a, whereby the vapor entering the condensers 109 and 115 from the de-entrainment heads 108 and 114 of the evaporator units 101 and 103, respectively, is condensed and the condensate is drained into the storage tank 501a. The condensate contained in the storage tank 501a is composed principally of $H_2O$, although it does contain a small amount of HCl and traces of uranium and metal impurities. In view of the fact that this condensate contained in the storage tank 501a does contain a trace of uranium singly enriched with $U^{235}$ with respect to natural or normal uranium, it is important that none of it be lost to the outside. In order to achieve this end, the condensate contained in the storage tank 501a is utilized as a wash solution in the subsequent washing of the deposits of $UCl_4$ residues from the parts disposed in the source regions of the second-stage calutrons. Thus, the condensate contained in the storage tank 501a, after it has been employed as a water wash solution, is placed in the storage tank 501 to be treated, as previously noted. Accordingly, this water wash solution, which constitutes a solvent for the $UCl_4$ residues deposited on the parts disposed in the source regions of the second-stage calutrons, is recycled.

Also, the plant comprises an electrolytic reducing cell 201, including an anode compartment and a cathode compartment and provided with a mercury cathode. Preferably, the electrolytic cell 201 is substantially identical to the electrolytic cell disclosed in the copending application of Robert Q. Boyer, Serial No. 556,127, filed Sept 28, 1944, which issued as Patent No. 2,733,202 on Jan, 31, 1956. Details of the operation of such an electrolytic cell are disclosed in said application and patent. The electrolytic cell of such application was an improvement of the cell disclosed in application S. N. 532,162, filed Apr. 21, 1944 and which issued as Patent No. 2,743,228 on Apr. 24, 1956. As disclosed therein and also as disclosed in divisional application S. N. 615,467, filed Sept. 10, 1945, now Patent No. 2,775,552, dated Dec. 25, 1956, derived therefrom, electrolytic currents of approximately 0.2 ampere per cm.$^2$ were obtained with the aforesaid cell with the usual operating limits being 0.1 to 0.3 ampere per cm.$^2$. The electrolytic currents mentioned were obtained with a direct current potential of several volts, i. e., about four volts. The anode compartment of the electrolytic cell 201 contains a suitable quantity of 3 N HCl as an anolyte; and the cathode compartment of the electrolytic cell 201 is connected to the second-stage evaporator unit 103, whereby the concentrated wash solution from the evaporator unit 103 is employed as a catholyte. Further, the cathode compartment of the electrolytic cell 201 is connected to a cooler 202, which in turn is connected to a precipitation tank 203. The cooler 202 is supplied with cooling water from a source, not shown; and the precipitation tank 203 is connected to a mixing tank 204 provided with a heating element 205 and connected to suitable sources of 3 N HCl and oxalic acid, not shown.

In the plant arrangement, the concentrated wash solution delivered from the second-stage evaporator unit 103 to the cathode compartment of the electrolytic cell 201 is rendered approximately 3 N in HCl, due to concentration in the evaporator units 101 and 103, and contains the ions: $UO_2^{++}$, $Fe^{+++}$, $Cr^{+++}$, $Ni^{++}$, and $Cu^{++}$, as previously noted. In passing through the cathode compartment of the electrolytic cell 201, this solution is electrolyzed, whereby the $UO_2^{++}$ and the $Fe^{+++}$ ions are reduced to $U^{++++}$ and $Fe^{++}$ ions, and a considerable amount of the $Cu^{++}$ ion is plated out into the mercury cathode, as explained more fully hereinafter. Accordingly, the solution delivered from the cathode compartment of the electrolytic cell 201 into the cooler 202 and thence into the precipitation tank 203 is about 3 N in HCl and contains the following ions: $U^{++++}$, $Fe^{++}$, $Cr^{+++}$, $Ni^{++}$, and $Cu^{++}$. Subsequently, when the warm mixture of 3 N HCl and oxalic acid is delivered from the mixing tank 204 into the precipitation tank 203, the solution delivered from the cooler 202 into the precipitation tank 203 is reacted, whereby the uranium is precipitated as $U(C_2O_4)_2 \cdot 6H_2O$ away from the ions: $Fe^{++}$, $Cr^{+++}$, $Ni^{++}$, and $Cu^{++}$ to produce a slurry.

Further, the plant comprises filtration apparatus 300, including a filtering tank 301, a washing tank 302, a drying tank 303, a scraping tank 304, a cleaning tank 305, and a number of filters of the candle type, five being illustrated at 306, 307, 308, 309, and 310 in the respective tanks 301, 302, 303, 304, and 305. Preferably each of the candle filters is of porous ceramic construction, being formed of Alundum or the like. The filtering tank 301 is connected to the precipitation tank 203, while the washing tank 302 is connected to a mixing tank 311 provided with a heating element 312 and connected to suitable sources of 1 N HCl and oxalic acid, not shown. The drying tank 303 is connected to a storage tank 313 containing a quantity of a suitable liquid drying agent, such, for example, as substantially anhydrous methyl alcohol, as explained more fully hereinafter. The scraping tank 304 is connected to a pulverizer 314 disposed therebelow; and the cleaning tank 305 is connected to a suitable source of sodium hypochlorite solution, not shown. The candle filters 306 and 307 are connected by way of manually adjustable valves 315 and 316, respectively, to a pump 317, which in turn is connected to a storage tank 318, whereby a cake of $U(C_2O_4)_2 \cdot 6H_2O$ precipitate may be loaded upon the candle filter 306 from the slurry delivered from the precipitation tank 203 into the filtering tank 301, and the wash solution contained in the washing tank 302 may be percolated through a cake of $U(C_2O_4)_2 \cdot 6H_2O$ precipitate carried by the candle filter 307, for a purpose more fully explained hereinafter. The candle filter 308 is connected by way of a manually adjustable valve 319 to a pump 320, whereby the substantially anhydrous methyl alcohol may be percolated through a cake of $U(C_2O_4)_2 \cdot 6H_2O$ percipitate carried by the candle filter 308. This arrangement effects drying of the cake of precipitate carried by the candle filter 308 and converts the $U(C_2O_4)_2 \cdot 6H_2O$ to $U(C_2O_4)_2 \cdot H_2O$, the methyl alcohol being rendered hydrous, all in a manner more fully explained hereinafter.

The pump 320 is connected to a solvent still 701, which is indirectly heated by a steam coil connected to a suitable source of steam, not shown. Also, the solvent still 701 is connected to an associated condenser 702 supplied with cooling water from a source, not shown; which condenser 702 is connected to the storage tank 313 for a purpose more fully explained hereinafter.

A cake of $U(C_2O_4)_2 \cdot H_2O$ precipitate carried by the candle filter 309 may be unloaded therefrom in the scraping tank 304, whereupon it falls into the pulverizer 314 in which it is broken up or pulverized into a finely divided state. From the candle filter 310 there has been previously unloaded a cake of $U(C_2O_4)_2 \cdot H_2O$ precipitate in the scraping tank 304; and in the cleaning tank 305 the candle filter 310 is washed in the contained solution of sodium hypochlorite in order to remove therefrom any residues of the cake of precipitate and again to open the pores in the wall of the candle filter 310, whereby the candle filter 310 is rendered suitable for re-use in the filtering tank 301. Thus it will be understood that any given candle filter 306, 307, 308, 309, or 310 is employed progressively in the tanks 301, 302, 303, 304, and 305 in a cyclic manner more fully explained hereinafter.

Also, the plant comprises a calciner 401 of any suitable type, which is associated with the pulverizer 314 and connected to a source of dry air under moderate pressure, not shown. The pulverized $U(C_2O_4)_2 \cdot H_2O$ is delivered from the pulverizer 314 to the calciner 401, wherein it is converted to $U_3O_8$ in a manner more fully explained hereinafter; which $U_3O_8$ is delivered to associated electrostatic precitating apparatus 402 of the Cottrell type. The precipitating apparatus 402 is connected to an absorbing tower 403, whereby reaction gases from the calciner 401 are first subjected to electrostatic precipitation in the precipitating apparatus 402 and then delivered to the absorbing tower 403, as explained more fully hereinafter. The absorbing tower 403 is open to the atmosphere and is connected to a pump 404, which in turn is connected to a storage tank 405 containing a suitable caustic soda solution, the storage tank 405 being also connected to the lower portion of the absorbing tower 403, whereby the caustic soda solution may be pumped from the storage tank 405 by the pump 404, sprayed through the absorbing tower 403, and returned back to the storage tank 405 in a cyclic manner. The arrangement of the absorbing tower 403 prevents the escape to the outside of any uranium contained in the reaction gases delivered thereto; and periodically the caustic soda solution contained in the associated storage tank 405 is removed therefrom and subjected to salvage treatment in order to recover the contained uranium, as explained more fully hereinafter.

A reactor 801 of the rotary type is associated with the precipitating apparatus 402; and $U_3O_8$ is delivered from the lower portion of the precipitating apparatus 402 to the reactor 801, wherein it is reacted with $CCl_4$ in the vapor phase to produce $UCl_4$. Preferably, the rotary reactor 801 is substantially identical to the rotary reactor disclosed in the copending application of Horace R. McCombie and Edward L. Wagner, Serial No. 523,602, filed February 23, 1944 which issued as Patent No. 2,735,746 on February 21, 1956. Also, the reactor 801 is connected to a source of dry $CO_2$ under moderate pressure, not shown, and to a storage tank 802 containing liquid $CCl_4$, the storage tank 802 being connected to a suitable source of liquid $CCl_4$, not shown. Also, the reactor 801 is connected to associated electrostatic precipitating apparatus 803 of the Cottrell type, provided with a condenser 804 which is supplied with cooling water from a source, not shown. The precipitating apparatus 803 is also connected to the absorbing tower 403, whereby reaction gases from the reactor 801 are first subjected to electrostatic precipitation in the precipitating apparatus 803 and then delivered to the absorbing tower 403, as explained more fully hereinafter. Vaporous $CCl_4$ is also delivered from the reactor 801 into the precipitating apparatus 803 along with the reaction gases, and is condensed by the condenser 804 and conducted to a solvent still 805 associated with the precipitating apparatus 803. The solvent still 805 is connected to a suitable source of dry steam, not shown, and also to an associated condenser 806 supplied with cooling water from a source, not shown. Also the condenser 806 preferably includes a communicating settling chamber (not shown) into which flows mixed condensate comprising $CCl_4$ and water, and in which the mixed condensate separates into layers, with the upper lighter layer comprising water being removed and discarded, or subjected to further salvage operations, and the lower heavier layer comprising $CCl_4$ being removed and returned to the storage tank 802 for a purpose more fully explained hereinafter. Since the layer of $CCl_4$ thus removed from the settling chamber may retain considerable residual water in association therewith, it may be found desirable to substantially completely dehydrate it prior to returning it to the storage tank 802. This may be accomplished in any convenient manner, such as by passing the wet $CCl_4$ through a drying column (not shown) packed with particles of a solid desiccant material such as anhydrous magnesium perchlorate, fused calcium chloride, or the like.

The $UCl_4$ produced in the reactor 801 is delivered therefrom and loaded into calutron charge bottles, one of which is illustrated at 807, which are subsequently sealed to retain the charges of $UCl_4$ in anhydrous condition. The bottles 807 filled with the charges of $UCl_4$ are again employed in the ion source units of the second-stage calutrons, in view of the fact that the uranium in these charges is singly enriched with $U^{235}$ with respect to natural or normal uranium, as previously noted and as disclosed in the previously mentioned application of Carter and Kamen.

Further, the plant comprises an oxidation tank 601 which is connected to the storage tank 318, whereby the filtrate percolated through the candle filter 306, as well as the wash solution percolated through the candle filter 307, may be delivered thereto. Also, the oxidation tank 601 is connected to the cleaning tank 305, whereby sodium hypochlorite solution contained in the cleaning tank 305 may be delivered to the oxidation tank 601. Further, the oxidation tank 601 is connected to the solvent still 701, whereby water accumulating in the solvent still 701 and carrying small amounts of $U^{++++}$ ion may be delivered to the oxidation tank 601. The electrolytic cell 201 also comprises a closed hood into which nitrogen from a source, not shown, is delivered, which serves to sweep therefrom chlorine liberated therein incident to operation; which hood is connected to the oxidation tank 601, whereby the mixture of nitrogen and chlorine swept from the hood of the electrolytic cell 201 is bubbled through the solution contained in the oxidation tank 601. The solution delivered from the storage tank 318 to the oxidation tank 601 contains $Fe^{++}$, $Cr^{+++}$, and $Ni^{++}$ ions, as well as small amounts of $U^{++++}$ and $Cu^{++}$ ions; the water delivered from the solvent still 701 to the oxidation tank 601 contains some $U^{++++}$ ion; and the sodium hypochlorite solution delivered from the cleaning tank 305 to the oxidation tank 601 contains considerable $UO_2^{++}$ ion. Accordingly, in the oxidation tank 601, the sodium hypochlorite solution in conjunction with the chlorine present oxidizes the composite solution contained therein, whereby a solution containing $UO_2^{++}$, $Fe^{+++}$, $Cr^{+++}$, $Ni^{++}$, and $Cu^{++}$ ions is produced; which last-mentioned solution is delivered to an associated precipitation tank 602. Also, the oxidation tank 601 is connected to the absorbing tower 403, whereby any gases produced therein incident to oxidation of the solution mentioned are conducted to the absorbing tower 403 in order that there may be reclaimed therefrom any contained uranium, as previously noted.

The precipitation tank 602 is connected to a suitable source of $NH_4OH$, not shown, whereby the uranium, iron, and chromium may be precipitated away from the nickel and copper in the contained solution to produce a slurry containing $(NH_4)_2U_2O_7$, $Fe(OH)_3$, and $(Cr(OH)_3$ precipitate, and $Ni(NH_3)_4^{++}$ and $$Cu(NH_3)_4^{++}$$

complexes. The precipitation tank 602 is connected to a pressure filter 603, whereby the slurry mentioned may be delivered from the precipitation tank 602 to the pressure filter 603 and the precipitate separated from the slurry. The pressure filter 603 is connected to a dissolving tank 604 and to an evaporator 703, whereby the $(NH_4)_2U_2O_7$, $Fe(OH)_3$ and $Cr(OH)_3$ precipitate may be delivered to the dissolving tank 604, and a filtrate containing the $Ni(NH_3)_4^{++}$ and $Cu(NH_3)_4^{++}$ complexes may be delivered to the evaporator 703. The dissolving tank 604 is connected to a suitable source of 4 N HCl, not shown, whereby the contained precipitate may be dissolved.

Further, the plant comprises an electrolytic salvage cell 605, including an anode compartment and a cathode compartment and provided with a mercury cathode. Preferably, the electrolytic cell 605 is substantially identical to the electrolytic cell disclosed in the previously-mentioned application of Robert Q. Boyer, Serial No. 556,127, filed September 28, 1944 which issued as Patent No. 2,733,202 on January 31, 1956. Details of the operation of such cell 605 are similar to those described above in connection with the operation of cell 201. Also, the electrolytic cell 605 comprises a closed hood into which nitrogen from a source, not shown, is delivered, which serves to sweep therefrom chlorine liberated therein incident to operation, as explained more fully hereinafter. The hood of the electrolytic cell 605 is also connected to the oxidation tank 601, whereby the mixture of nitrogen and chlorine from the electrolytic cell 605 is delivered to the oxidation tank 601 for the purpose previously explained. The anode compartment of the electrolytic cell 605 contains a suitable quantity of 3 N HCl as an anolyte; and the cathode compartment of the electrolytic cell 605 is connected to the dissolving tank 604, whereby the HCl solution contained in the dissolving tank 604 may be delivered to the electrolytic cell 605 to be electrolyzed. Also, the cathode compartment of the electrolytic cell 605 is connected to the oxidation tank 502, whereby the electrolyzed solution contained in the cathode compartment of the electrolytic cell 605 may be delivered to the oxidation tank 502. The HCl solution delivered from the dissolving tank 604 to the cathode compartment of the electrolytic cell 605 is about 3 N in HCl and contains $UO_2^{++}$, $Fe^{+++}$, and $Cr^{+++}$ ions; and when it is electrolyzed in the electrolytic cell 605, substantially all of the $Fe^{+++}$ and $Cr^{+++}$ ions contained therein are plated out into the mercury cathode, and the uranium is reduced from $UO_2^{++}$ ion to $U^{++++}$ ion. Thus, the electrolyzed solution delivered from the cathode compartment of the electrolytic cell 605 to the oxidation tank 502 contains $U^{++++}$ ion and traces of $Fe^{++}$, $Cr^{+++}$, and $Cr^{++}$ ions.

Further, the plant comprises a scrubber column 503, connected to a suitable source of water, not shown, and a scrubber column 504 connected to a suitable source of HNO₃, not shown. Also, the scrubber column 503 is connected to the electrolytic cells 201 and 605, whereby mercury from the cells containing copper, nickel, iron and chromium, and a small amount of $U^{++++}$ ion may be delivered thereto. More particularly, the upper portion of the scrubber column 503 comprises a capillary device, not shown, whereby the mercury delivered thereto is divided into extremely small globules and dropped into the contained column of water, in order that they may be thoroughly scrubbed incident to passage therethrough. Also, the scrubber column 503 is connected adjacent the lower portion thereof to the oxidation tank 502, whereby water may be delivered from the scrubber column 503 into the oxidation tank 502. Preferably, water is continuously supplied to the upper portion of the scrubber column 503 and delivered therefrom adjacent the lower portion thereof, whereby small amounts of $U^{++++}$ ion are scrubbed from the globules of mercury falling through the scrubber column 503 and are accumulated in the column of water. Thus, the water delivered from the scrubber column 503 into the oxidation tank 502 contains some $U^{++++}$ ion.

Also, the scrubber column 504 is connected to the lower portion of the scrubber column 503, whereby mercury accumulating in the lower portion of the scrubber column 503 and containing copper, nickel, iron, and chromium may be delivered thereto. More particularly, the upper portion of the scrubber column 504 comprises a capillary device, not shown, whereby the mercury delivered thereto is divided into extremely small globules and dropped into the contained column of HNO₃, in order that they may be thoroughly scrubbed incident to passage therethrough. Also, the scrubber column 504 is connected adjacent the lower portion thereof to the evaporator 703, whereby HNO₃ may be delivered from the scrubber column 504 into the evaporator 703. Preferably, HNO₃ is continuously supplied to the upper portion of the scrubber column 504 and delivered therefrom adjacent the lower portion thereof, whereby copper, nickel, iron, and chromium are scrubbed from the globules of mercury falling through the scrubber column 504 and are accumulated in the column of HNO₃. Thus, the HNO₃ delivered from the scrubber column 504 to the evaporator 703 contains copper, nickel, iron, and chromium, and the mercury accumulating in the lower portion of the scrubber column 504 is substantially free of the metals mentioned. The lower portion of the scrubber column 504 is connected to the electrolytic cells 201 and 605, whereby substantially pure mercury may be supplied from the scrubber column 504 to the mercury cathodes of the cells mentioned, in a cyclic manner more fully explained hereinafter.

The evaporator 703 is supplied with dry steam from a source, not shown, whereby the HNO₃ carrying $Cu^{++}$, $Fe^{+++}$, $Cr^{+++}$, and $Ni^{++}$ ions delivered thereto from the scrubber column 504, and the chloride-ammonium hydroxide solution carrying $Ni(NH_3)_4^{++}$ and $Cu(NH_3)_4^{++}$ complexes delivered thereto from the pressure filter 603, may be evaporated to dryness. Also, the evaporator 703 is connected to a salt storage bin 704 adapted to receive the chloride and nitrate salts of iron, copper, nickel, and chromium produced in the evaporator 703 incident to evaporation of the contained solution; which salts contained in the salt storage bin 704 are subjected to salvage in a manner more fully explained hereinafter. Further, the evaporator 703 is connected to a condenser 705 supplied with cooling water from a source, not shown, whereby the vapors driven from the solution contained in the evaporator 703 incident to evaporation may be condensed. Finally, the condenser 705 is connected to a storage tank 706, whereby the condensate accumulating in the condenser 705 may be delivered to the storage tank 706; which condensate contained in the storage tank 706 is subjected to salvage in a manner more fully explained hereinafter.

The over-all operation of the plant arrangement will best be understood from the following description of the processes involved in the treatment therein of a calutron wash solution in conjunction with the various reactions employed. Considering now in greater detail the character of the wash solution contained in the storage tank 501, it is noted that 27 liters of a representative wash solution has approximately the following composition by weight:

| | Grams |
|---|---|
| H₂O | 26,850 |
| HCl | 196 |
| U | 50 |
| Fe | 3 |
| Ni | 1½ |
| Cr | ¾ |
| Cu | ½ |

Also, this representative wash solution may contain a small amount of suspended $U(OH)_4$ and bits of metallic copper, as well as the ions $UO_2^{++}$, $U^{++++}$, $Fe^{+++}$, $Fe^{++}$, $Cu^{++}$, $Cr^{+++}$, and $Ni^{++}$, as previously noted. Accordingly, the wash solution is conducted from the storage tank 501 into the oxidation tank 502 and there contacted with H₂O₂, whereby the solution is oxidized. As a result of the oxidation, all of the uranium is put in solution as uranyl ion, $UO_2^{++}$, suspended copper is put in solution as cupric ion, $Cu^{++}$, the iron is put in solution as ferric ion, $Fe^{+++}$, and other dissolved materials are put in their higher stable oxidation states, if they are not already in such states.

The oxidized solution containing $UO_2^{++}$, $Fe^{+++}$, $Cu^{++}$, $Cr^{+++}$, and $Ni^{++}$ ions is conducted into the first-stage evaporator unit 101, whereby it is concentrated by evaporation and conducted into the storage tank 102. Preferably, the solution is supplied continuously through the manually adjustable valve 105 into the header 104, and conducted continuously from the header 104 through the manually adjustable valve 106 into the storage tank 102, the rates of flow being predetermined by adjustment of the valves 105 and 106, so that the solution experiences a reduction in volume of the order of 66% due to treatment in the first-stage evaporator unit 101. In other words, during a predetermined time interval 30 liters of solution is conducted through the valve 105 into the header 104, and 10 liters of concentrated solution is conducted from the header 104 through the valve 106 into the storage tank 102, 20 liters of this solution having been driven off as vapor by action of the evaporator 107 of the evaporator unit 101 and condensed in the condenser 109. The vapor driven from the solution comprises primjarily water vapor, although it contains a small amount of HCl; and the condensate accumulating in the condenser 109 is returned to the storage tank 501a.

The concentrated solution contained in the storage tank 102 is conducted into the second-stage evaporator unit 103, whereby it is concentrated by evaporation and conducted into the cathode compartment of the electrolytic cell 201. Preferably, the solution is supplied continuously through the manually adjustable valve 111 into the header 110, and conducted continuously from the header 110 through the manually adjustable valve 112 into the cathode compartment of the electrolytic cell 201, the rates of flow being predetermined by adjustment of the valves 111 and 112, so that the solution experiences a reduction in volume of the order of 90% due to treatment in the second-stage evaporator unit 103. In other words, during a predetermined time interval, 10 liters of solution is conducted through the valve 111 into the header 110, and one liter of concentrated solution is conducted from the header 110 through the valve 112 into the cathode compartment of the electrolytic cell 201, 9 liters of this solution having been driven off as vapor by action of the evaporator 113 of the evaporator unit 103 and condensed in the condenser 115. The vapor driven from the solution comprises primarily water vapor, although it contains some HCl; and the condensate accumulating in the condenser 115 is returned to the storage tank 501a.

Each of the evaporator units 101 and 103 is of the flash-boiler type, whereby there is considerable recirculation including the associated evaporator, the de-entrainment head, and the header in series circuit relation; which arrangement minimizes entrainment of uranium in the vapor condensing in the associated condensers 109 and 115. However, since the condensates accumulating in the condensers 109 and 115 and draining into the storage tank 501a does contain traces of uranium, the solution accumulated in the storage tank 501a is utilized as a wash solution in the subsequent washing of deposits of UCl₄ residues from the parts disposed in the source regions of the second-stage calutrons, as previously noted.

In view of the foregoing description of the mode of operation of the evaporator units 101 and 103, it will be understood that during a predetermined time interval 30 liters of solution from the oxidation tank 502 is delivered to the first-stage evaporator unit 101 and one liter of concentrated solution is delivered from the second-stage evaporator unit 103 to the cathode compartment of the electrolytic cell 201, whereby the HCl, uranium, iron, chromium, nickel, and copper in the solution conducted into the cathode compartment of the electrolytic cell 201 are considerably concentrated with respect to the solution contained in the oxidation tank 502.

For example, 0.9 liter of a representative solution conducted from the second-stage evaporator unit 103 into the cathode compartment of the electrolytic cell 201 has approximately the following composition by weight:

|  | Grams |
|---|---|
| H₂O | 846 |
| HCl | 98 |
| U | 50 |
| Fe | 3 |
| Ni | 1½ |
| Cr | ¾ |
| Cu | ½ |

Accordingly, the solution conducted into the cathode compartment of the electrolytic cell 201 is approximately 3 N in HCl and contains $UO_2^{++}$, $Fe^{+++}$, $Cr^{+++}$, $Ni^{++}$, and $Cu^{++}$ ions.

The anode compartment of the electrolytic cell 201 contains a suitable quantity of 3 N HCl as an anolyte, while the concentrated solution conducted from the evaporator unit 103 into the cathode compartment of the electrolytic cell 201 constitutes a catholyte; whereby the solution mentioned is electrolyzed, the uranyl and ferric ions, $UO_2^{++}$ and $Fe^{+++}$, being reduced to uranous and ferrous ions, $U^{++++}$ and $Fe^{++}$. Also, some chlorine is liberated in the electrolytic cell 201, which accumulates in the hood thereof and is swept therefrom by nitrogen supplied thereto, whereby the mixture of nitrogen and chlorine is conducted from the hood of the electrolytic cell 201 into the oxidation tank 601. Preferably, the concentrated solution from the evaporator unit 103 is continuously conducted into the cathode compartment of the electrolytic cell 201 and this solution, after being electrolyzed, is continuously conducted therefrom into the cooler 202, the flow being at a proper rate in order to insure substantially complete reduction of the uranyl and ferric ions to uranous and ferrous ions as explained above, whereby the solution conducted from the cathode compartment of the electrolytic cell 201 into the cooler 202 is approximately 3 N HCl and contains the following ions: $U^{++++}$, $Fe^{++}$, $Cr^{+++}$, $Ni^{++}$, and $Cu^{++}$.

Also, incident to operation of the electrolytic cell 201, a considerable amount of the copper and some of the nickel in the solution contained in the cathode compartment is plated out into the mercury cathode and conducted along with the mercury into the scrubber column 503. Preferably, fresh mercury from the scrubber column 504 is continuously supplied to the electrolytic cell 201 and the mercury therein is continuously delivered to the scrubber column 503, whereby the metal impurities, principally copper and nickel, accumulating in the mercury cathode of the electrolytic cell 201 are continuously transported therefrom along with the mercury into the scrubber column 503. In passing through the cathode compartment of the electrolytic cell 201, the solution mentioned is heated considerably above room temperature, temperatures of the order of 80° C. being frequently encountered; and it is preferable to operate the cooler 202 under such conditions that the electrolyzed solution delivered thereto is cooled back to room temperature, approximately 20° C., before it is delivered to the precipitation tank 203. The cooling of the electrolyzed solution delivered to the cooler 202 from the cathode compartment of the electrolytic cell 201, before the introduction of this solution into the precipitation tank 203, is very advantageous in that substantial re-oxidation of $U^{++++}$ ion back to $UO_2^{++}$ ion, due to contact with air, is prevented.

In the mixing tank 204, there is prepared a saturated solution of oxalic acid in about 3 N HCl, which solution is heated to a temperature of approximately 60° C. by the heating element 205 in order to prevent the oxalic acid from crystalizing out. This warm solution of oxalic acid in approximately 3 N HCl is conducted in a stoichiometric excess into the precipitation tank 203, whereby the uranium contained in the solution supplied to the precipitation tank 203 from the cooler 202 is substantially completely precipitated as uranous oxalate away from the copper, iron, chromium, and nickel impurities in the solution. Accordingly, a slurry is produced containing $U(C_2O_4)_2 \cdot 6H_2O$ and $Fe^{++}$, $Cr^{+++}$, $Ni^{++}$, $Cu^{++}$, and perhaps a trace of $U^{++++}$ ions. The precipitation of the uranium as uranous oxalate away from the metal impurities in the solution is most advantageously effected when the acidity of the slurry produced is about 1 N to 3 N in hydrogen ion.

The slurry produced in the precipitation tank 203 is conducted to the filtering tank 301 and the valve 315 is opened an appropriate amount while the pump 317 is operating, whereby a cake of $U(C_2O_4)_2 \cdot 6H_2O$ precipitate is loaded upon the exterior surface of the candle filter 306 and a filtrate containing $Fe^{++}$, $Cr^{+++}$, $Ni^{++}$, $Cu^{++}$, and a trace of $U^{++++}$ ions is delivered into the storage tank 318. After a suitable cake of $U(C_2O_4)_2 \cdot 6H_2O$ precipitate has been loaded upon the candle filter 306, the valve 315 is closed and the candle filter 306 is removed from the filtering tank 301 and placed in the washing tank 302.

Now assuming that a suitable cake of $U(C_2O_4)_2 \cdot 6H_2O$ precipitate is carried by the candle filter 307 arranged in the washing tank 302, the cake of precipitate having been previously loaded upon the candle filter 307 in the filtering tank 301 in the manner noted, the valve 316 is opened an appropriate amount while the pump 317 is operating, whereby the cake of $U(C_2O_4)_2 \cdot 6H_2O$ precipitate carried by the candle filter 307 is washed. More particularly, in the mixing tank 311 there is prepared a dilute solution of oxalic acid in about 1 N HCl, the solution being approximately 0.2 molar in oxalic acid, which solution is heated to a temperature of approximately 60° C. by the heating element 312. This warm solution of oxalic acid in approximately 1 N HCl is conducted into the washing tank 302 and percolated through the cake of $U(C_2O_4)_2 \cdot 6H_2O$ precipitate as noted above, the wash solution being then delivered into the storage tank 318. Thus, the filtrate from the filtering tank 301 and the wash solution from the washing tank 302 are delivered by the pump 317 to the storage tank ions, whereby the wash solution delivered from the washing tank 302 to the storage tank 318 may contain a trace of $U^{++++}$ ion. After the cake of $U(C_2O_4)_2 \cdot 6H_2O$ precipitate carried by the candle filter 307 has been suitably washed, the valve 316 is closed and the candle filter 307 is removed from the washing tank 302 and placed in the drying tank 303.

Now assuming that a suitable cake of $U(C_2O_4)_2 \cdot 6H_2O$ precipitate is carried by the candle filter 308 arranged in the drying tank 303, the cake of precipitate having been previously washed in the washing tank 302 in the manner noted, the valve 319 is opened an appropriate amount while the pump 320 is operating, whereby the cake of $U(C_2O_4)_2 \cdot 6H_2O$ precipitate carried by the candle filter 308 is dried. More particularly, a suitable drying agent, preferably substantially anhydrous methyl alcohol, is delivered from the storage tank 313 into the drying tank 303, whereby the substantially anhydrous methyl alcohol is percolated through the cake of $U(C_2O_4)_2 \cdot 6H_2O$ precipitate as noted above, the wash solution being then delivered by the pump 320 into the solvent still 701. While the liquid drying agent employed may be selected from a relatively large class including a lower monohydric alcohol (methyl, ethyl, propyl, and isopropyl alcohols), an ether (methylethyl, dimethyl, and diethyl ethers), and a ketone (acetone and methyl-ethyl ketones), it is preferable that the drying agent comprise the lower monohydric alcohol, methyl or ethyl alcohols, and specifically methyl alcohol. More particularly, any of the liquid drying agents mentioned is effective to remove from the cake of $U(C_2O_4)_2 \cdot 6H_2O$ precipitate carried by the candle filter 308 occluded or trapped water, but only certain of these liquid drying agents (methyl and ethyl alcohols) have been found effective to remove from the cake of $U(C_2O_4)_2 \cdot 6H_2O$ precipitate carried by the candle filter 308 some of the water of hydration. Specifically, methyl alcohol is particularly effective in this regard, causing the $U(C_2O_4)_2 \cdot 6H_2O$ precipitate to be converted to $U(C_2O_4)_2 \cdot H_2O$, whereby the methyl alcohol percolated through the cake of precipitate carried by the candle filter 308 and delivered to the solvent still 701 is rendered hydrous. Also, the methyl alcohol percolated through the cake of precipitate carried by the candle filter 308 and delivered to the solvent still 701 carries a small amount of $U^{++++}$ ion. When the cake of precipitate carried by the candle filter 308 is converted from $U(C_2O_4)_2 \cdot 6H_2O$ to $U(C_2O_4)_2 \cdot H_2O$, the color thereof is changed from green to violet, whereby satisfactory dehydration of the hydrous cake of precipitate carried by the candle filter 308 may be readily determined from inspection. After the cake of $U(C_2O_4)_2 \cdot 6H_2O$ carried by the candle filter 308 has been suitably dried to produce a cake of $U(C_2O_4)_2 \cdot H_2O$ precipitate as noted above, the valve 319 is closed and the candle filter 308 is removed from the drying tank 303 and placed in the scraping tank 304.

Now assuming that a suitable cake of $U(C_2O_4)_2 \cdot H_2O$ is carried by the candle filter 309 arranged in the scraping tank 304, the cake of precipitate having been previously dried in the drying tank 303 in the manner noted, the candle filter 309 is rotated about its axis, whereby scraping mechanism, diagrammatically illustrated, incorporated in the scraping tank 304 unloads the cake of $U(C_2O_4)_2 \cdot H_2O$ from the candle filter 309 and scrapes the exterior surface thereof, whereby the $U(C_2O_4)_2 \cdot H_2O$ precipitate falls into the pulverizer 314. The

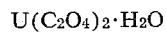

precipitate is broken up and placed in finely divided form by pulverizing mechanism, diagrammatically illustrated, incorporated in the pulverizer 314. The $U(C_2O_4)_2 \cdot H_2O$ accumulating in the lower portion of the pulverizer 314 is delivered to the calciner 401; and after the candle filter 309 has been appropriately scraped in the scraping tank 304 in order to remove therefrom substantially all of the cake of $U(C_2O_4)_2 \cdot H_2O$ precipitate carried thereby, the candle filter 309 is removed from the scraping tank 304 and placed in the cleaning tank 305.

Now assuming that the candle filter 310 arranged in the cleaning tank 305 has previously had a cake of $U(C_2O_4)_2 \cdot H_2O$ precipitate unloaded therefrom in the scraping tank 304 in the manner noted, a small amount of $U(C_2O_4)_2 \cdot H_2O$ is carried thereby and the pores in the wall thereof are at least partially blocked by the compound mentioned. The surfaces of the candle filter 310 are thoroughly washed with a hypochlorite solution contained in the cleaning tank 305. Preferably, the solution mentioned comprises sodium hypochlorite, as this material is very effective in washing from the surfaces of the candle filter 310 any $U(C_2O_4)_2 \cdot H_2O$ deposited thereon and in opening the pores of the wall of the candle filter 310. Also, the uranous oxalate is decomposed and the contained uranium is placed in solution as $UO_2^{++}$ ion due to the presence of $OCl^-$ anion in the solution, the $U^{++++}$ ion being oxidized to $UO_2^{++}$ ion. The sodium hypochlorite wash solution is delivered from the cleaning tank 305 into the oxidation tank 601, and an excess quantity of sodium hypochlorite solution is employed in washing the candle filter 310, so that considerable unreacted sodium hypochlorite solution is delivered into the oxidation tank 601 for use therein, as more fully explained hereinafter. After the surfaces of the candle filter 310 have been thoroughly washed in the cleaning tank 305, the candle filter 310 is removed from the cleaning tank 305 and placed in the filtering tank 301. Thus, the candle filters 306, 307, 308, 309, and 310 are placed successively in the tanks 301, 302, 303, 304, and 305 in a cyclic manner, and it will be understood that in fact it is not necessary to employ five such candle filters, as it will be apparent that even one candle filter will suffice in the cyclic process or that a number of candle filters larger than five may be employed as a matter of convenience.

The pulverized $U(C_2O_4)_2 \cdot H_2O$ is delivered from the lower portion of the pulverizer 314 as a charge to one end of the calciner 401, along with a stream of dry air, wherein it is heated to a temperature of approximately 500° C., whereby the $U(C_2O_4)_2 \cdot H_2O$ is converted to $U_3O_8$, reaction gases and vapors including $CO$, $CO_2$, and $H_2O$ being produced incident to the calcination. The other end of the calciner 401 is connected to the precipitating apparatus 402 and the product, $U_3O_8$, along with the reaction gases, is delivered to the precipitating apparatus 402, whereby $U_3O_8$ accumulates in the lower portion of the precipitating apparatus 402 and the reaction gases, as well as air, proceed up through the precipitating apparatus 402 into the absorbing tower 403. The precipitating apparatus 402 is effective to cause electrostatic precipitation of a majority of the finely divided $U_3O_8$ contained in the stream of reaction gases and vapors delivered to the absorbing tower 403, whereby only a small amount of uranium is transported from the precipitating apparatus 402 into the absorbing tower 403.

The $U_3O_8$ accumulating in the lower portion of the precipitating apparatus 402 is continuously delivered into one end of the rotary reactor 801, and dry $CO_2$ and liquid $CCl_4$ are introduced into the other end of the rotary reactor 801. The liquid $CCl_4$ is converted into vapor and reacted with the $U_3O_8$ in the presence of the $CO_2$ atmosphere at a temperature within the range 425° to 475° C. in order to produce $UCl_4$ and reaction gases including $COCl_2$, $CO$, $CO_2$, and $Cl_2$, along with a minor amount of $UCl_5$ in the form of a finely divided smoke. The product, $UCl_4$, produced in the rotary reactor 801 is continuously delivered therefrom and loaded into the calutron charge bottles 807. Preferably, the bottles 807 are sealed in order to preserve the anhydrous condition of the charge of $UCl_4$; which charge bottles 807 are employed in the ion source units of the second-stage calutrons, as previously noted.

The reaction gases, the $UCl_5$, and considerable amounts of CCl₄ vapor are delivered from the rotary reactor 801 into the precipitating apparatus 803, which is effective to precipitate electrostatically substantially all of the UCl₅ contained in the gases and vapor mentioned. Also, the condenser 804 associated with the precipitating apparatus 803 is effective to condense substantially all of the CCl₄ vapor, which CCl₄ condensate accumulates in the lower portion of the precipitating apparatus 803, carrying with it substantially all of the UCl₅ precipitated, in view of the fact that UCl₅ is fairly soluble in CCl₄. The gaseous reaction products, $COCl_2$, $CO$, $CO_2$, and $Cl_2$, continue through the precipitating apparatus 803 and are delivered into the absorbing tower 403, while the liquid CCl₄ and the UCl₅ accumulating in the lower portion of the precipitating apparatus 803 are delivered into the solvent still 805.

Accordingly, from the precipitating apparatus 402 and 803, $COCl_2$, $Cl_2$, $CO$, $CO_2$, air, and $H_2O$ gases and vapor are delivered into the absorbing tower 403 and contacted with the finely divided spray of NaOH therein, the NaOH being continuously recirculated through the lower portion of the absorbing tower 403, the storage tank 405, the pump 404, and the upper portion of the absorbing tower 403. Thus, the gases and vapor mentioned are thoroughly washed with the NaOH spray, thereby positively to scrub therefrom any contained uranium in order to prevent loss thereof to the outside. Also, the sodium hydroxide readily absorbs the $CO_2$ gas and readily reacts the $COCl_2$ and $Cl_2$ gases, whereby the two last-mentioned noxious gases are prevented from being exhausted to the atmosphere from the upper portion of the absorbing tower 402. It will, of course, be understood that $COCl_2$ and $Cl_2$ gases are reacted with NaOH to produce a carbonate and chloride and hypochlorite solution. Occasionally, the liquid contained in the storage tank 405 may be subjected to salvage in order to reclaim any contained uranium; and the scrubbed gases are discharged from the upper portion of the absorbing tower 403 to the atmosphere as previously noted.

The hydrous methyl alcohol, containing small amounts of $U^{++++}$ ion, percolated through the cake of precipitate carried by the candle filter 308 is delivered by the pump 320 into the solvent still 701, as previously noted, and is therein subjected to fractionation, whereby substantially anhydrous methyl alcohol vapor is liberated in the solvent still 701 and condensed in the condenser 702, and water containing $U^{++++}$ ion accumulates in the lower portion of the solvent still 701. The substantially anhydrous methyl alcohol condensate accumulating in the condenser 702 is delivered back to the storage tank 313, whereby it may be again conducted into the drying tank 303 in a cyclic manner; while the water containing $U^{++++}$ ion accumulating in the lower portion of the solvent still 701 is delivered to the oxidation tank 601, as previously noted.

The liquid CCl₄, containing UCl₅, is delivered from the lower portion of the precipitating apparatus 803 to the solvent still 805, as previously noted, and is therein subjected to distillation by direct contact with dry steam, whereby CCl₄ vapor is liberated in the solvent still 805 and, together with water vapor, is condensed in the condenser 806, and water containing $UO_2^{++}$ and $U^{++++}$ ions accumulates in the lower portion of the solvent still 805. The mixed condensate comprising CCl₄ and water is subjected to layer formation for the separation of CCl₄ and water, the latter being removed and discarded or subjected to further salvage operations, while if desired the former is subjected to dehydration to substantially completely remove any residual water which it may contain, after which it is delivered back to the storage tank 802, whereby it may be again conducted into the rotary reactor 801 in a cyclic manner; while the water containing the $UO_2^{++}$ and $U^{++++}$ ions accumulating in the lower portion of the solvent still 805 comprises a solution which is conducted directly back into the cathode compartment of the electrolytic cell 201, as previously noted.

The solution delivered from the storage tank 318 to the oxidation tank 601 comprises an oxalic acid solution containing $Fe^{++}$, $Cr^{+++}$, and $Ni^{++}$ ions, as well as small amounts of $U^{++++}$ and $Cu^{++}$ ions; the water delivered from the solvent still 701 to the oxidation tank 601 contains some $U^{++++}$ ion; and the sodium hypochlorite solution delivered from the cleaning tank 305 to the oxidation tank 601 contains considerable $UO^{++}$ ion. Accordingly, in the oxidation tank 601 the sodium hypochlorite solution in conjunction with the chlorine present oxidizes the composite solution contained therein, whereby a solution containing $UO_2^{++}$, $Fe^{+++}$, $Cr^{+++}$, $Ni^{++}$, and $Cu^{++}$ ions is produced. As previously noted, the mixtures of nitrogen and chlorine are delivered into the oxidation tank 601 from the hoods of the electrolytic cells 201 and 605 and are bubbled through the composite solution; while the upper portion of the oxidation tank 601 is connected to the absorbing tower 403, whereby any uranium contained in the gases delivered from the oxidation tank 601 to the absorbing tower 403 is reclaimed in the absorbing tower 403 in the manner previously explained. Also, it will be understood that incident to oxidation of the ions mentioned to their higher stable oxidation states, the oxalic acid solution is also decomposed by chlorine and hypochlorite ion oxidation, whereby $CO_2$ is produced which is delivered along with excess $Cl_2$ and nitrogen from the oxidation tank 601 to the absorbing tower 403, as previously noted. Preferably, the sodium hypochlorite solution employed in cleaning the candle filters in the cleaning tank 305, and subsequently in oxidizing the oxalic acid solution in the oxidation tank 601, is substantially free of basic hydroxide, and a solution is employed which contains approximately 2.6% sodium hypochlorite by weight and which has a pH of approximately 9.7 prior to liberation of the available chlorine. A commercially available sodium hypochlorite solution, sold under the trademark "Clorox," has been found to be quite satisfactory when diluted as indicated above. The utilization of a sodium hypochlorite solution of the general character specified has been found very advantageous, in that the normal tendency of the $UO_2^{++}$ ion to precipitate as $Na_2U_2O_7$ after the solution has stood a while is prevented.

The solution containing $UO_2^{++}$, $Fe^{+++}$, $Cr^{+++}$, $Ni^{++}$, and $Cu^{++}$ ions delivered from the oxidation tank 601 to the precipitation tank 602 is subjected therein to ammonia treatment, either with excess $NH_3$ or carbonate-free $NH_4OH$, whereby $(NH_4)_2U_2O_7$, $Fe(OH)_3$, and $Cr(OH)_3$ are precipitated away from most of the copper and nickel in solution in the form of ammonia complex ions $Cu(NH_3)_4^{++}$ and $Ni(NH_3)_4^{++}$; and this slurry is delivered to the pressure filter 603. In the pressure filter 603, the precipitate of $(NH_4)_2U_2O_7$, $Fe(OH)_3$, and $Cr(OH)_3$ is separated from the slurry and a filtrate is produced containing the $Ni(NH_3)_4^{++}$ and $Cu(NH_3)_4^{++}$ complexes, the precipitate being delivered to the dissolving tank 604 and the filtrate being delivered to the evaporator 703, as previously noted.

In the dissolving tank 604, the $(NH_4)_2U_2O_7$, $Fe(OH)_3$, and $Cr(OH)_3$ precipitate is dissolved in an excess of 4 N HCl, whereby after dissolution there is produced a 3 N HCl solution containing $UO_2^{++}$, $Fe^{+++}$, and $Cr^{+++}$ ions, which solution is delivered as a catholyte to the cathode compartment of the electrolytic cell 605, the anode compartment of the electrolytic cell 605 containing a suitable quantity of 3 N HCl as an anolyte, as previously noted. In the electrolytic cell 605, the solution mentioned is electrolyzed, whereby substantially all of the $Fe^{+++}$ and $Cr^{+++}$ ions contained therein are plated out into the mercury cathode and the uranium is reduced to $U^{++++}$ ion.

after being electrolyzed is continuously conducted therefrom into the oxidation tank 502, the flow being at a proper rate in order to insure substantially complete plating out of the iron and chromium into the mercury cathode and substantially complete reduction of the uranyl ion to the uranous ion, as explained above. Thus, this solution conducted from the cathode compartment of the electrolytic cell 605 into the oxidation tank 502 comprises a HCl solution containing $U^{++++}$ ion. Also, some chlorine is liberated in the electrolytic cell 605, which accumulates in the hood thereof and is swept therefrom by nitrogen supplied thereto, whereby the mixture of nitrogen and chlorine is conducted from the hood of the electrolytic cell 605 into the oxidation tank 601, as previously noted.

Preferably, fresh mercury from the scrubber column 504 is continuously supplied to the electrolytic cell 605 and the mercury therein is continuously delivered to the scrubber column 503, whereby the metal impurities, principally iron and chromium, accumulating in the mercury cathode of the electrolytic cell 605 are continuously transported therefrom along with the mercury into the scrubber column 503. Also, the mercury conducted from the cathode of the electrolytic cell 605 to the scrubber column 503 carries a small amount of $U^{++++}$ ion therewith along with the metal impurities mentioned, the $U^{++++}$ ion being mechanically trapped in the mercury incident to operation thereof.

The mercury from the electrolytic cell 201 and the mercury from the electrolytic cell 605 are combined, whereby the composite mercury introduced into the scrubber column 503 contains copper, nickel, iron, and chromium impurities, as well as a small amount of $U^{++++}$ ion mechanically trapped therein. Preferably, the mercury mentioned is continuously conducted to the upper portion of the scrubber column 503 and is divided into small globules by the capillary device and dropped through the water column, whereby it is thoroughly scrubbed and the $U^{++++}$ ion is placed in the water solution. Preferably, water is continuously supplied to the upper portion of the scrubber column 503 and is continuously delivered therefrom adjacent the lower portion thereof and conducted into the oxidation tank 502, whereby the solution introduced into the oxidation tank 502 contains $U^{++++}$ ion.

Preferably, the mercury containing copper, nickel, iron, and chromium impurities accumulating in the lower portion of the scrubber column 503 is continuously conducted into the upper portion of the scrubber column 504 and is divided into small globules by the capillary device and dropped into the $HNO_3$ column, whereby it is thoroughly scrubbed and the copper, nickel, iron, and chromium impurities are placed in solution as $Cu^{++}$, $Ni^{++}$, $Fe^{+++}$, and $Cr^{+++}$ ions. Preferably, the $HNO_3$ is continuously supplied to the upper portion of the scrubber column 504 and is continuously delivered therefrom adjacent the lower portion thereof and conducted into the evaporator 703. Preferably, the clean mercury accumulating in the lower portion of the scrubber column 504 is continuously supplied to the electrolytic cells 201 and 605, as previously noted.

The nitrate solution from the scrubber column 504, carrying $Cu^{++}$, $Cr^{+++}$, $Fe^{+++}$, and $Ni^{++}$ ions, is combined with the chloride-ammonium hydroxide solution from the pressure filter 603 carrying $Ni(NH_3)_4^{++}$ and $Cu(NH_3)_4^{++}$ complexes, and this composite solution is delivered to the evaporator 703, wherein it is evaporated to dryness. The chloride and nitrate salts of iron, copper, nickel, and chromium produced in the evaporator 703 are delivered to the salt storage bin 704 and are subsequently subjected to salvage in order to recover therefrom any traces of contained uranium. The vapor liberated in the evaporator 703 is condensed in the condenser 705 and this condensate is delivered to the storage tank 706, and is subsequently subjected to salvage in order to recover therefrom any traces of contained uranium.

The solution containing $U^{++++}$ ion from the scrubber column 503 and the solution containing $U^{++++}$ ion from the cathode compartment of the electrolytic cell 605 are combined to produce a composite solution delivered to the oxidation tank 502, wherein the composite solution is mixed with the solution delivered to the oxidation tank 502 from the storage tank 501, which final solution is then contacted with $H_2O_2$ in order that all of the uranous ion is oxidized to uranyl ion, as previously explained.

In view of the foregoing description of the processes involved in the treatment of a calutron wash solution in the plant arrangement, it will be understood that various combinations of steps have been employed to provide cyclic operation, and that substantially all of the filtrates, precipitates, and other reaction products produced incident to carrying out the various steps of the processes are subjected to appropriate salvage treatments in order to prevent loss of the contained uranium to the outside, whereby the plant arrangement is highly efficient in the conservation of uranium enriched with $U^{235}$ with respect to natural or normal uranium and effects efficient overall operation of the calutron method of producing uranium enriched with the isotope $U^{235}$.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The process of reclaiming uranium values from the parts of a calutron upon which it is deposited comprising washing the parts mentioned with a solvent for the uranium, whereby uranyl ions and the ions of metal impurities of a class that forms soluble oxaltes in acid solution are introduced in the wash solution, subjecting the wash solution to a reducing treatment to convert the uranyl into uranous ions in the solution, then treating the solution with a stoichiometric excess of oxalic and hydrochloric acids to precipitate the uranium as uranous oxalate away from metal impurities in the solution forming a slurry which is about 1 to 3 N in hydrochloric acid, separating the wet uranous oxalate precipitate from the solution, contacting the wet uranous oxalate precipitate with a suitable liquid drying agent, whereby the wet uranous oxalate precipitate is dried, and then calcining the dried uranous oxalate precipitate to produce a uranium oxide.

2. The process of reclaiming uranium values from the parts of a calutron upon which it is deposited comprising washing the parts mentioned with a solvent for the uranium, whereby uranyl ions and the ions of metal impurities of a class that forms soluble oxalates in acid solution are introduced in the wash solution, subjecting the wash solution to a reducing treatment to convert the uranyl into uranous ions in the solution, then treating the solution with a stoichiometric excess of oxalic and hydrochloric acids to precipitate the uranium as hydrous uranous oxalate away from the metal impurities in the solution forming a slurry which is about 1 to 3 N in hydrochloric acid, separating the hydrous uranous oxalate precipitate from the solution, contacting the hydrous uranous oxalate precipitate with a suitable liquid drying agent to remove therefrom some water of hydration, and then calcining the partially dehydrated uranous oxalate precipitate to produce a uranium oxide.

3. The process of reclaiming uranium values from the parts of a calutron upon which it is deposited comprising washing the parts mentioned with a solvent for the uranium, whereby uranyl irons and the ions of metal impurities of a class that forms soluble oxalates in acid solution are introduced in the wash solution, subjecting the wash solution to a reducing treatment to convert the uranyl into uranous ions in the solution, then treating the solution with a stoichiometric excess of oxalic and hydrochloric acids to precipitate the uranium as uranous oxalate hexahydrate away from the metal impurities in the solution forming a slurry which is about 1 to 3 N in hydrochloric acid, separating the uranous oxalate hexahydrate precipitate from the solution, contacting the uranous oxalate hexahydrate precipitate with a suitable liquid drying agent to produce uranous oxalate monohydrate, and then calcining the uranous oxalate monohydrate to produce a uranium oxide.

4. The process of reclaiming uranium values from the parts of a calutron upon which it is deposited comprising washing the parts mentioned with a solvent for the uranium, whereby uranyl ions and the ions of metal impurities of a class that forms soluble oxalates in acid solution are introduced in the wash solution, subjecting the wash solution to a reducing treatment to convert uranyl into uranous ions in the solution, then treating the solution with a stoichiometric excess of oxalic and hydrochloric acids to precipitate the uranium as uranous oxalate hexahydrate away from the metal impurities in the solution forming a slurry which is about 1 to 3 N in hydrochloric acid, separating the uranous oxalate hexahydrate precipitate from the solution, contacting the uranous oxalate hexahydrate precipitate with a substantially anhydrous lower monohydric alcohol to produce uranous oxalate monohydrate, and then calcining the uranous oxalate monohydrate to produce a uranium oxide.

5. The process of reclaiming uranium values from the parts of calutron upon which it is deposited comprising washing the parts mentioned with a solvent for the uranium, whereby uranyl ions and the ions of metal impurities of a class that forms soluble oxalates in acid solution are introduced in the wash solution, subjecting the wash solution to a reducing treatment to convert the uranyl into uranous ions in the solution, then treating the solution with a stoichiometric excess of oxalic and hydrochloric acids to precipitate the uranium as uranous oxalate hexahydrate away from the metal impurities in the solution forming a slurry which is about 1 to 3 N in hydrochloric acid, separating the uranous oxalate hexahydrate precipitate from the solution, contacting the uranous oxalate hexahydrate precipitate with a substantially anhydrous lower monohydric alcohol to produce uranous oxalate monohydrate, whereby the alcohol is rendered hydrous, calcining the uranous oxalate monohydrate to produce a uranium oxide, fractionating the hydrous alcohol to render it substantially anhydrous, recovering the water separated from the alcohol incident to fractionation, reclaiming any fraction of uranium contained in the recovered water, and then contacting another uranous oxalate hexahydrate precipitate with the fractionated substantially anhydrous alcohol.

6. The process comprising loading hydrous uranous oxalate precipitate contained in a slurry containing impurities of a class which forms soluble oxalates in acid solution upon a candle filter to form a cake, percolating through the cake of hydrous uranous oxalate precipitate carried by the candle filter a wash solution of oxalic and hydrochloric acids to remove residual impurities of said class, then percolating through the cake of hydrous uranous oxalate precipitate carried by the candle filter a suitable liquid drying agent to remove therefrom some water of hydration, then unloading the partially dehydrated cake of uranous oxalate precipitate from the candle filter, percolating through the candle filter a suitable liquid solvent for uranous oxalate in order to salvage therefrom any residues of uranous oxalate precipitate carried thereby, and again loading hydrous uranous oxalate precipitate contained in a slurry upon the candle filter.

7. The process comprising loading uranous oxalate hexahydrate precipitate contained in a slurry containing impurities of a class which forms soluble oxalates in acid solution upon a candle filter to form a cake, percolating through the cake of uranous oxalate hexahydrate precipitate carried by the candle filter a wash solution of oxalic and hydrochloric acids to remove residual impurities of said class, then percolating through the cake of uranous oxalate hexahydrate precipitate carried by the candle filter a substantially anhydrous lower monohydric alcohol to produce a cake of uranous oxalate monohydrate, then unloading the cake of uranous oxalate monohydrate from the candle filter, percolating through the candle filter a solution containing OCl⁻ anion in order to salvage therefrom any residues of uranous oxalate monohydrate carried thereby, and again loading uranous oxalate hexahydrate precipitate contained in a slurry upon the candle filter.

8. The process of reclaiming uranous oxalate from the surfaces of apparatus upon which it is deposited comprising washing the surfaces mentioned with a solution containing OCl⁻ anion in a concentration equivalent to about 2.6% of sodium hypochlorite and having a pH of about 9.7, whereby there is produced a stable solution of uranyl ion.

9. The process of decomposing uranous oxalate and placing the uranium in solution comprising contacting the uranous oxalate with a solution containing OCl⁻ anion in a concentration equivalent to about 2.6% of sodium hypochlorite and having a pH of about 9.7, whereby there is produced a stable solution of uranyl ion.

10. The process of decomposing uranous oxalate and placing the uranium in solution comprising contacting the uranous oxalate with a solution of sodium hypochlorite of about 2.6% concentration and having a pH of about 9.7, whereby there is produced a stable solution of uranyl ion.

11. The process of reclaiming uranium values from an original solution also containing metal impurities of a class that forms soluble oxalates in acid solution comprising treating the original solution to produce a dilute hydrochloric acid solution containing ions of uranium and metal impurities in their higher oxidation states, concentrating the dilute solution by evaporation, subjecting the concentrated solution to electrolytic treatment, thereby to reduce the contained ions of uranium and metal impurities to their lower oxidation states, treating the electrolyzed solution with a stoichiometric excess of oxalic and hydrochloric acids to precipitate the uranium as uranous oxalate away from the metal impurities in the solution forming a slurry which is about 1 to 3 N in hydrochloric acid, filtering the solution to separate the uranous oxalate precipitate therefrom, whereby the filtrate contains the metal impurities and a fraction of the uranium, treating the filtrate with hypochrite oxidizing agent to destroy the contained oxalic acid and to oxidize the contained ions of uranium and metal impurities to their higher oxidation states, then treating the solution with ammonium hydroxide to precipitate the fraction of uranium as ammonium diuranate and the metal impurities as hydroxides in the solution, filtering the solution to separate the precipitate, dissolving the precipitate in hydrochloric acid, whereby there are placed in solution ions of uranium and the metal impurities in their higher oxidation states, subjecting the solution to electrolytic treatment in order substantially to plate out of solution the contained metal impurities, thereby to produce an electrolyzed solution containing the fraction of uranium and a fraction of the metal impurities, and then producing a composite solution from which uranium is to be reclaimed of the treated solution and another original solution of the character mentioned.

12. The process of salvaging a fraction of uranium from a solution also containing metal impurities comprising subjecting the solution to treatment in an electrolytic cell provided with a mercury [illegible] tially to plate out of [illegible] the contained [illegible]

fraction of uranium and only a fraction of the metal impurities and a mercury cathode containing a trace of the uranium and substantially all of the metal impurities, and then separately recovering the uranium contained in both the electrolyzed solution and the mercury cathode.

13. The process of salvaging a fraction of uranium from a solution also containing metal impurities comprising subjecting the solution to treatment in an electrolytic cell provided with a mercury cathode in order substantially to plate out of the solution into the mercury cathode the contained metal impurities, thereby to produce an electrolyzed solution containing substantially all of the fraction of uranium and only a fraction of the metal impurities and a mercury cathode containing a trace of the uranium and substantially all of the metal impurities, recovering the uranium contained in the electrolyzed solution, scrubbing the mercury of the cathode with a wash solution to remove therefrom the contained trace of uranium, and then recovering the uranium from the wash solution.

14. The process comprising calcining uranous oxalate in a stream of dry air at a temperature of about 500° C., whereby the uranous oxalate is converted to uranosic oxide and reaction gases are evolved carrying a fraction of the uranium, recovering substantially all of the uranosic oxide produced incident to calcination, subjecting the last-mentioned reaction gases to electrostatic precipitation in order to reclaim substantially all of the fraction of uranium carried thereby, whereby the last-mentioned reaction gases after being subjected to electrostatic precipitation carry a trace of uranium, reacting the uranosic oxide and carbon tetrachloride in the vapor phase at a temperature of about 475° C., whereby the uranosic oxide is converted to uranium tetrachloride and reaction gases are evolved carrying a fraction of the uranium, recovering substantially all of the uranium tetrachloride produced incident to the reaction, subjecting the last-mentioned reaction gases to electrostatic precipitation in order to reclaim substantially all of the fraction of uranium carried thereby, whereby the last-mentioned reaction gases after being subjected to electrostatic precipitation carry a trace of uranium, combining the first-mentioned reaction gases after they have been subjected to electrostatic precipitation and the last-mentioned reaction gases after they have been subjected to elecrostatic precipitation, and then scrubbing the combined reaction gases with a suitable liquid solvent in order to salvage the trace of uranium carried thereby.

15. The process comprising calcining uranous oxalate in a stream of dry air at a temperature of about 500° C., whereby the uranous oxalate is converted to uranosic oxide and reaction gases are evolved carrying a fraction of the uranium, recovering substantially all of the uranosic oxide produced incident to calcination, subjecting the reaction gases to electrostatic precipitation in order to reclaim substantially all of the fraction of uranium carried thereby, whereby the reaction gases after being subjected to electrostatic precipitation carry a trace of uranium, and then scrubbing the reaction gases with a suitable liquid solvent in order to salvage the trace of uranium carried thereby.

16. The process comprising reacting uranosic oxide and carbon tetrachloride in the vapor phase at a temperature of about 475° C., whereby the uranosic oxide is converted to uranium tetrachloride and reaction gases are evolved carrying a fraction of the uranium, recovering substantially all of the uranium tetrachloride produced incident to the reaction, subjecting the reaction gases to electrostatic precipitation in order to reclaim substantially all of the fraction of uranium carried thereby, whereby the reaction gases after being subjected to electrostatic precipitation carry a trace of uranium, and then scrubbing the reaction gases with a suitable liquid solvent in order to salvage the trace of uranium carried thereby.

17. The process of reclaiming uranium from a hydrochloric acid solution containing $UO_2^{++}$ ion comprising subjecting the solution to a reducing treatment in order to reduce $UO_2^{++}$ ion to $U^{++++}$ ion in which treatment the solution is heated to above about 80° C., thereafter cooling the solution to below about 20° C. in order to prevent substantial re-oxidation of $U^{++++}$ ion back to $UO_2^{++}$ ion, and then reacting the solution with a stoichiometric excess of oxalic acid in order to precipitate uranium as uranous oxalate.

References Cited in the file of this patent

UNITED STATES PATENTS

| | | |
|---|---|---|
| 1,050,796 | Bleecker | Jan. 21, 1913 |
| 1,054,102 | Fischer | Feb. 25, 1913 |
| 1,210,714 | Seil | Jan. 2, 1917 |
| 1,224,014 | Parsons | Apr. 24, 1917 |
| 1,286,400 | Pellegrin | Dec. 3, 1918 |
| 1,526,943 | Thews | Feb. 17, 1925 |
| 1,900,996 | Palmaer | Mar. 14, 1933 |
| 2,176,609 | McCormack | Oct. 17, 1939 |

OTHER REFERENCES

Friend: Textbook of Inorganic Chemistry, vol. 7, part 3, pages 287, 289, 290, 307 (1926). Pub. by Charles Griffin and Co., London.

Babor et al.: General College Chemistry, 2nd. edition, (1940), page 317. Pub. by Thos. Y. Crowell Co., N. Y.